(12) United States Patent
Tuttle et al.

(10) Patent No.: US 7,293,901 B2
(45) Date of Patent: Nov. 13, 2007

(54) OPTICS FOR CONTROLLING THE DIRECTION OF LIGHT RAYS AND ASSEMBLIES INCORPORATING THE OPTICS

(75) Inventors: Darin D. Tuttle, Byron Center, MI (US); John K. Roberts, East Grand Rapids, MI (US); Timothy A. Bonardi, Buchanan, MI (US); Jeremy A. Fogg, Holland, MI (US); John W. Carter, Holland, MI (US); Timothy J. Thomas, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 200 days.

(21) Appl. No.: 10/796,649

(22) Filed: Mar. 9, 2004

(65) Prior Publication Data

US 2005/0201113 A1    Sep. 15, 2005

(51) Int. Cl.
 *B60Q 1/26* (2006.01)
(52) U.S. Cl. .................. 362/494; 362/521; 362/545
(58) Field of Classification Search .............. 362/494, 362/503, 521, 522, 544, 545, 330, 331, 332, 362/334, 336, 337
See application file for complete search history.

(56) References Cited

U.S. PATENT DOCUMENTS

| | | |
|---|---|---|
| 1,518,787 A | 12/1924 | Hall |
| 5,005,009 A | 4/1991 | Roberts |
| 5,014,167 A | 5/1991 | Roberts |
| 5,128,659 A | 7/1992 | Roberts et al. |
| 5,207,492 A | 5/1993 | Roberts |
| 5,371,659 A | 12/1994 | Pastrick et al. |
| 5,788,357 A | 8/1998 | Muth et al. |
| 5,803,579 A | 9/1998 | Turnbull et al. |
| 5,949,331 A | 9/1999 | Schofield et al. |
| 6,000,823 A | 12/1999 | Desmond et al. |
| 6,087,953 A | 7/2000 | DeLine et al. |
| 6,124,886 A | 9/2000 | DeLine et al. |
| 6,139,172 A | 10/2000 | Bos et al. |
| 6,172,613 B1 | 1/2001 | DeLine et al. |
| 6,176,602 B1 | 1/2001 | Pastrick et al. |
| 6,183,119 B1 | 2/2001 | Desmond et al. |
| 6,222,447 B1 | 4/2001 | Schofield et al. |
| 6,222,460 B1 | 4/2001 | DeLine et al. |
| 6,257,746 B1 | 7/2001 | Todd et al. |
| 6,276,821 B1 | 8/2001 | Pastrick et al. |
| 6,294,989 B1 | 9/2001 | Schofield et al. |
| 6,326,900 B2 | 12/2001 | DeLine et al. |
| 6,329,925 B1 | 12/2001 | Skiver et al. |
| 6,331,066 B1 | 12/2001 | Desmond et al. |
| 6,335,548 B1 | 1/2002 | Roberts et al. |
| 6,366,213 B2 | 4/2002 | DeLine et al. |
| 6,386,742 B1 | 5/2002 | DeLine et al. |
| 6,412,973 B1 | 7/2002 | Bos et al. |
| 6,416,208 B2 | 7/2002 | Pastrick et al. |
| 6,428,172 B1 | 8/2002 | Hutzel et al. |
| 6,441,943 B1 | 8/2002 | Roberts et al. |
| 6,445,287 B1 | 9/2002 | Schofield et al. |
| 6,483,438 B2 | 11/2002 | DeLine et al. |
| 6,498,620 B2 | 12/2002 | Schofield et al. |

(Continued)

*Primary Examiner*—Y. My Quach-Lee
(74) *Attorney, Agent, or Firm*—Price, Heneveld, Cooper, DeWitt & Litton, LLP; James E. Shultz, Jr.

(57) ABSTRACT

The present invention relates to improvements in controlling the direction of light rays.

78 Claims, 22 Drawing Sheets

U.S. PATENT DOCUMENTS

| | | |
|---|---|---|
| 6,501,387 B2 | 12/2002 | Skiver et al. |
| 6,521,916 B2 | 2/2003 | Roberts et al. |
| 6,550,949 B1 | 4/2003 | Bauer et al. |
| 6,568,839 B1 | 5/2003 | Pastrick et al. |
| 6,611,202 B2 | 8/2003 | Schofield et al. |
| 6,642,851 B2 | 11/2003 | DeLine et al. |
| 6,648,477 B2 | 11/2003 | Hutzel et al. |
| 6,670,207 B1 | 12/2003 | Roberts |
| 6,672,744 B2 | 1/2004 | DeLine et al. |
| 6,685,348 B2 | 2/2004 | Pastrick et al. |
| 6,690,268 B2 | 2/2004 | Schofield et al. |
| 6,756,912 B2 | 6/2004 | Skiver et al. | ously

OPTICS FOR CONTROLLING THE DIRECTION OF LIGHT RAYS AND ASSEMBLIES INCORPORATING THE OPTICS

BACKGROUND

It has become desirable to provide a host of indicators, illuminators and information displays within various vehicle systems. More recently these devices have incorporated light emitting diodes as the light source that produces light rays.

What are needed are assemblies that emit light rays predominantly in a desired direction. Vehicle systems incorporating these assemblies are also needed.

SUMMARY

What are provided are assemblies for controlling the direction of light rays. Vehicle systems incorporating these assemblies are also provided.

BRIEF DESCRIPTION OF THE FIGURES

FIG. 2b depicts an exploded, perspective, view of the assembly of FIG. 2a;

FIG. 3b depicts a second perspective view of the assembly of FIG. 3a;

DETAIL DESCRIPTION

Vehicles commonly incorporate various indicators, illuminators and displays. As the use of these devices multiplies, it becomes more desirable to selectively direct associated light rays such that a majority of the light rays emitted by any given light source are substantially visible when viewed from only a desired viewing perspective.

In at least one embodiment of the present invention a light source is positioned such that associated light rays pass through at least one substrate of a rearview mirror element. In related embodiments, at least one indicator, illuminator or information display is configured to be substantially covert when not activated. In a preferred embodiment, substantially all of the light rays emitted from at least one light source are redirected to be visible from the perspective of a driver of a vehicle traveling in the "blind spot" associated with a driver of a controlled vehicle. Yet, the associated light rays are substantially not visible from the perspective of the driver of the controlled vehicle. A related assembly is described in detail herein to be incorporated in an exterior rearview mirror assembly of a controlled vehicle as a blind spot viewable, supplemental turning indicator assembly; it is preferable that the driver of the controlled vehicle not see the associated light rays. In at least one embodiment, a central axis of the associated light rays emitted by a light source is directed approximately 32° approximately 15°/–10°) outboard, away, from the controlled vehicle, rendering the light rays substantially invisible with regard to a driver of the controlled vehicle. In related embodiments, the central optical axis of the associated light rays forms between approximately 25° and approximately 40° (+approximately 10° to approximately 20°/–approximately 5° to approximately 25°) outboard, away, from the controlled vehicle. The given angle may be a function of an expected mirror element angle with respect to the controlled vehicle and, or, a driver thereof. It should be understood that the angle formed between the controlled vehicle and the mirror element is user selectable. In at least one embodiment, a surface mount light emitting diode is used with a corresponding circuit board placement within 1 mm, horizontally and vertically, of a desired center placement point. Preferably, the supplemental turning indicator assembly is designed to allow for 1 mm maximum displacement.

Figure 1:
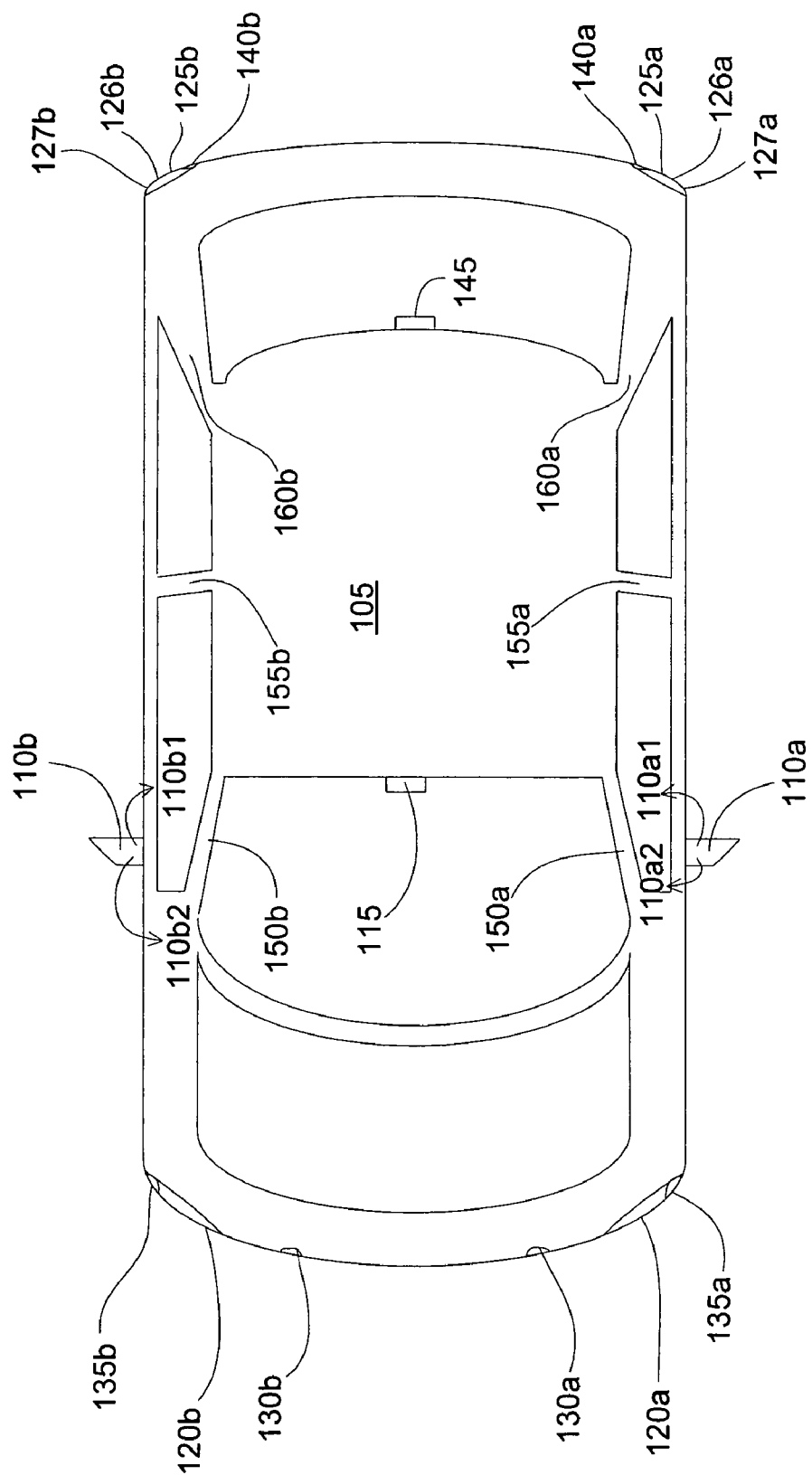
FIG. 1 depicts a controlled vehicle.

Turning now to FIG. 1 there is shown a controlled vehicle 105 comprising a driver's side rearview mirror 110a, a passenger's side rearview mirror 110b and rearview mirror 115. In a preferred embodiment, these rearview mirrors are configured to provide a driver of a controlled vehicle a view of substantially all of a scene generally rearward looking direction. As depicted, preferably the rearview mirrors 110a, 110b are configured to swivel rearwardly 110a1, 110b1 and forwardly 110a2, 110b2 relative to a controlled vehicle. Details of various embodiments of the present invention are described herein in conjunction with further description of various vehicle systems.

With additional reference to FIG. 1, the controlled vehicle is depicted to comprise taillight assemblies 125a, 125b; break lights 126a, 126b; rear turn signals 127a, 127b; backup lights 140a, 140b; headlight assemblies 120a, 120b; foul weather lights 130a, 130b; front turn signals 135a, 135b and a center high mounted stop light (CHMSL) 145. It should be understood that the controlled vehicle may comprise various combinations of the exterior lights described with respect to FIG. 1. It should also be understood that the controlled vehicle may comprise additional exterior lights or may even comprise individual assemblies that provide combined functionality. Such as a headlight assembly that functions as a daytime running light, a low beam headlight, a high beam headlight, any one thereof, a subcombination thereof or a combination thereof. Continuously variable, bi-xenon, headlights are a specific example.

As additionally shown in FIG. 1, the controlled vehicle may comprise A-pillars 150a, 150b; B-pillars 155a, 155b and C-pillars 160a, 160b. Any of these locations, along with the rearview mirrors and exterior light assemblies, provide suitable locations for at least one imager, at least one indicator, at least one illuminator, at least one information display, any one thereof, a subcombination thereof or a combination thereof.

Figure 2A:
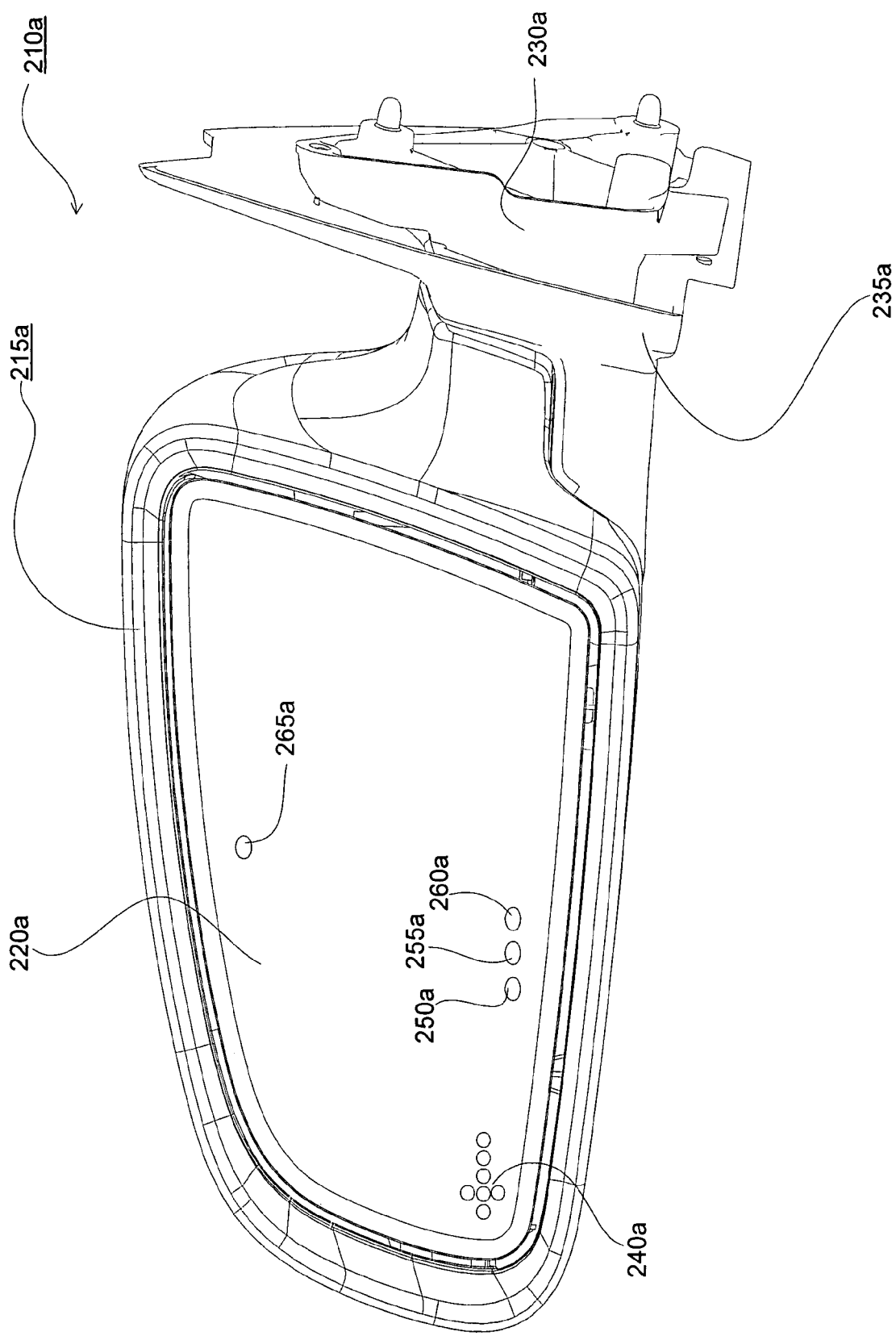
FIG. 2a depicts an exterior rearview mirror assembly.
Figure 2B:
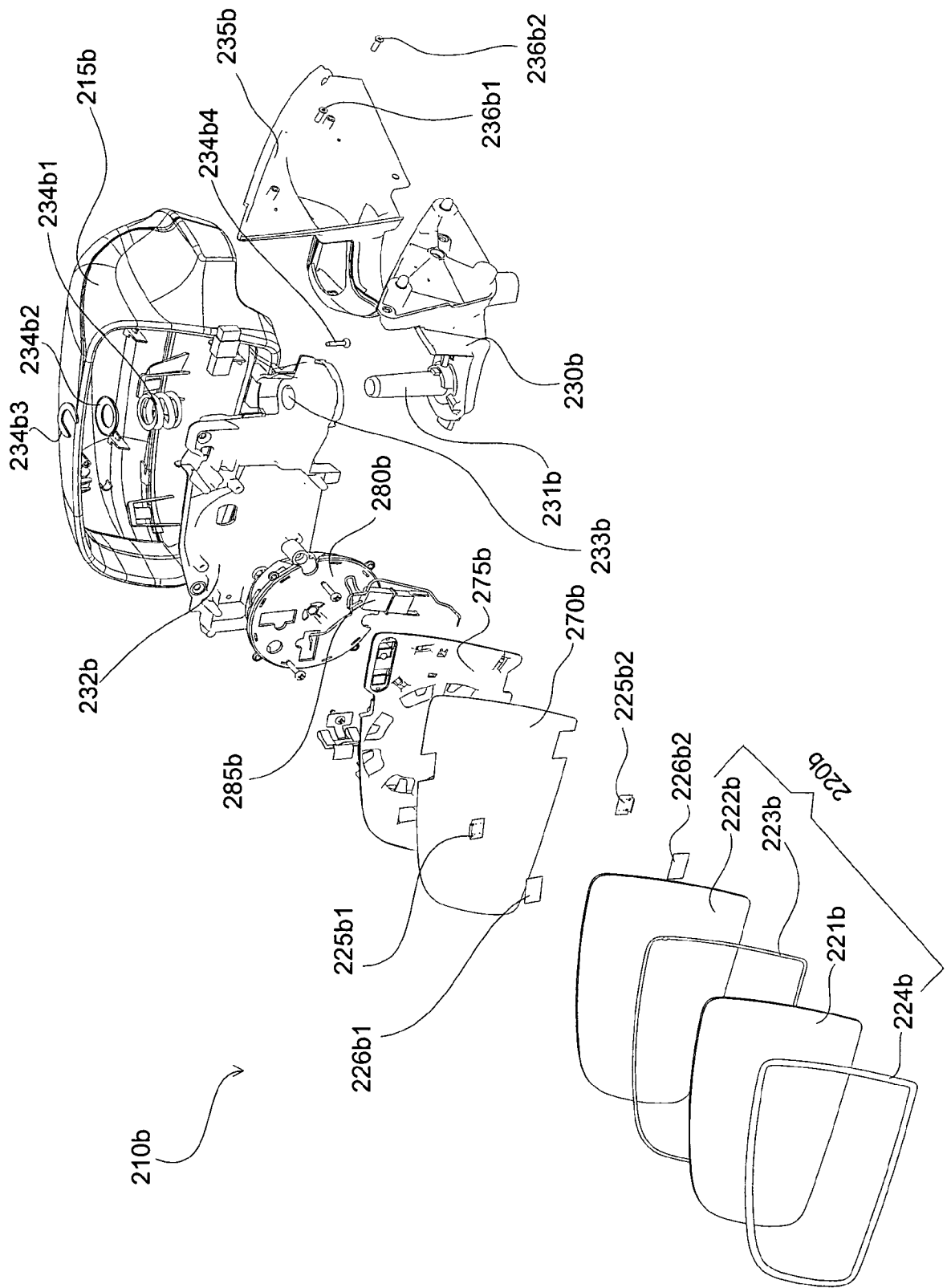

Turning to FIGS. 2a and 2b, there is shown a rearview mirror assembly 210a, 210b. Preferably, the mirror assembly comprises a mirror housing 215a, 215b comprising a mirror element 220a, 220b. Preferably, the mirror housing is configured to be pivotally mounted to a vehicle swivel structure 230a, 230b via a mirror swivel structure 232b. In at least one embodiment, the mirror assembly comprises a powered swivel means for swiveling the mirror swivel structure female portion 233b about the vehicle swivel structure male portion 231b. In at least one embodiment, the powered swivel means is configured to automatically swivel the mirror housing to a desired position in response to a corresponding button on a "keyfob." For example, a remote keyless entry system may be configured to swivel at least one mirror housing in a rearward direction in addition to unlocking a corresponding door. This functionality allows multiple use of a single illuminator, for example, a security light 255a may also serve as a keyhole/door illuminator 260a. In at least one embodiment, at least one light source of a supplemental turning indicator assembly is configured to provide a keyhole/door illuminator. The light source may be configured to emit a different spectral band of light rays as a function of the swivel position of an associated rearview mirror. For example, the light rays may be predominantly amber as a supplemental turning indicator assembly and predominantly white as a keyhole/door illuminator. It should be understood that the "unlock" button on a keyfob may be used or a devoted additional button may be added. Optionally, a given keyfob button may be configured such that a predetermined sequence of activations induces a predetermine swivel position. Additionally, the rearview mirror housing may be configured to swivel in a forwardly direction when subject to a "break away" force; preferably, the mirror housing would swivel and not break away. It should be understood that the keyfob button functionality may be configured to be user selectable or programmable. In at least one embodiment, a rearview mirror is configured such that it reverts to a predetermined swivel position upon opening of a door, closing a door, initiation of an ignition function, a second keyfob button, a keyfob sequence of button activation, anyone thereof, a subcombination thereof or combination thereof. It should be understood that a rearview mirror assembly may be configured with vertical swivel functionality in addition to, or in lieu of, the horizontal functionality described herein.

With further reference to FIGS. 2a and 2b, the rearview mirror assembly comprises a supplemental turning indicator assembly 240a; a blind spot indicator 250a; a security light 255a; a keyhole/door illuminator 260a and a generally rearward facing photo sensor 265a. Preferably, these devices are positioned behind the mirror element with respect to a viewer such that they are at least partially covert. The mirror element 220a, 220b comprises a first substrate 221b and a second substrate 222b secured in a spaced apart relationship with one another via a primary seal 223b to form a chamber there between. Preferably, the chamber comprises an electro-optic medium such as those disclosed in commonly assigned U.S. Pat. Nos. 4,902,108, 5,128,799, 5,278,693, 5,280,380, 5,282,077, 5,294,376, 5,336,448, 5,808,778 and 6,020,987; the entire disclosures of which are incorporated herein in their entireties by reference. The mirror element further comprises electrical clips 225b1, 225b2, preferably, secured to the second substrate via adhesive 226b1, 226b2. The mirror element is then attached to a carrier 275b, preferably, via adhesive 270b. The carrier is attached to the mirror swivel structure 232b via a positioner 280b. The mirror swivel structure is secured to the vehicle swivel structure via spring 234b1, washer 234b2, lock ring 234b3 and fastener 234b4. The vehicle swivel structure is secured to the vehicle shroud 235a, 235b via fasteners 236b1, 136b2.

Figure 2C:
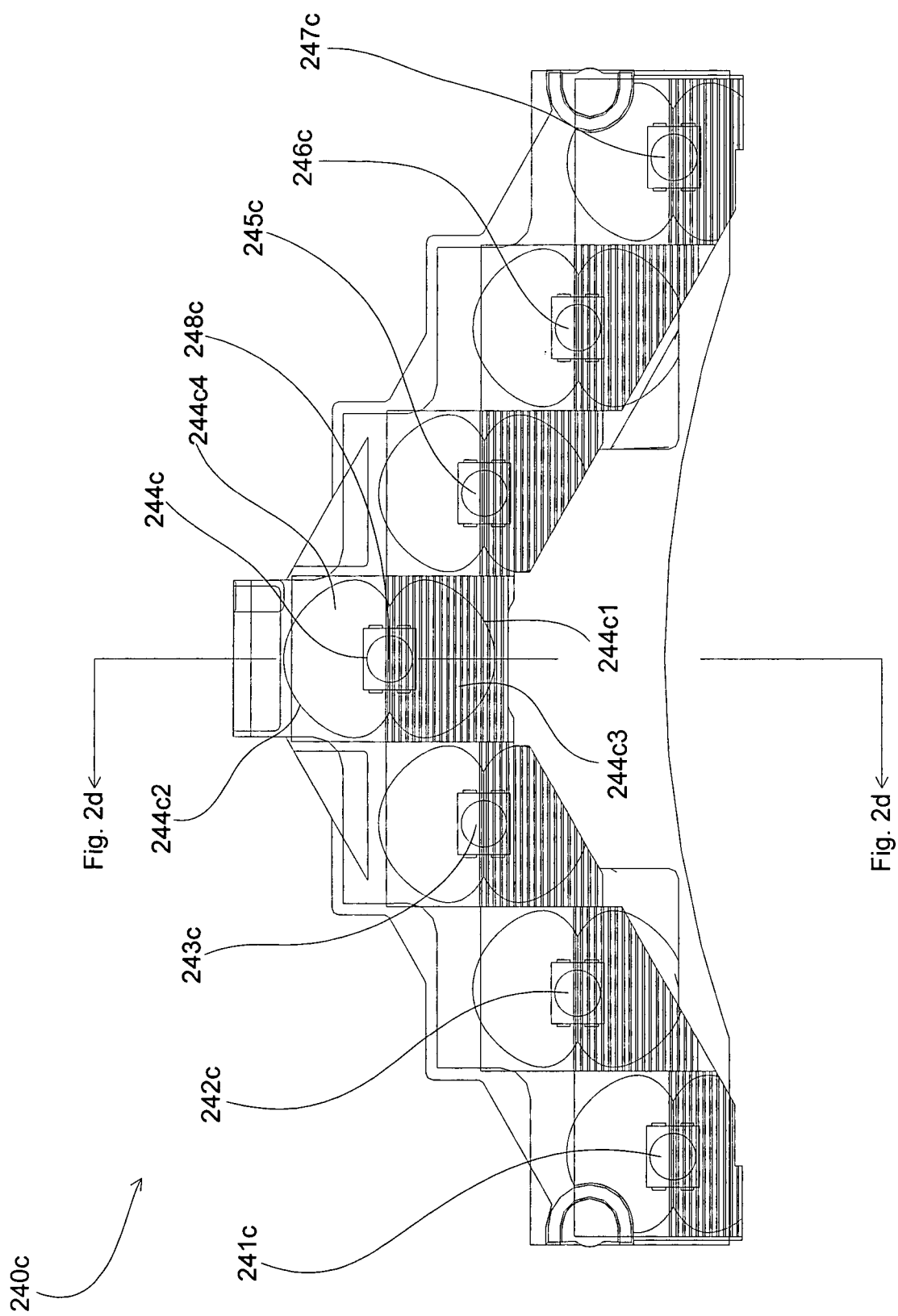
FIG. 2c depicts a plan view of a turn signal indicator.
Figure 2D:
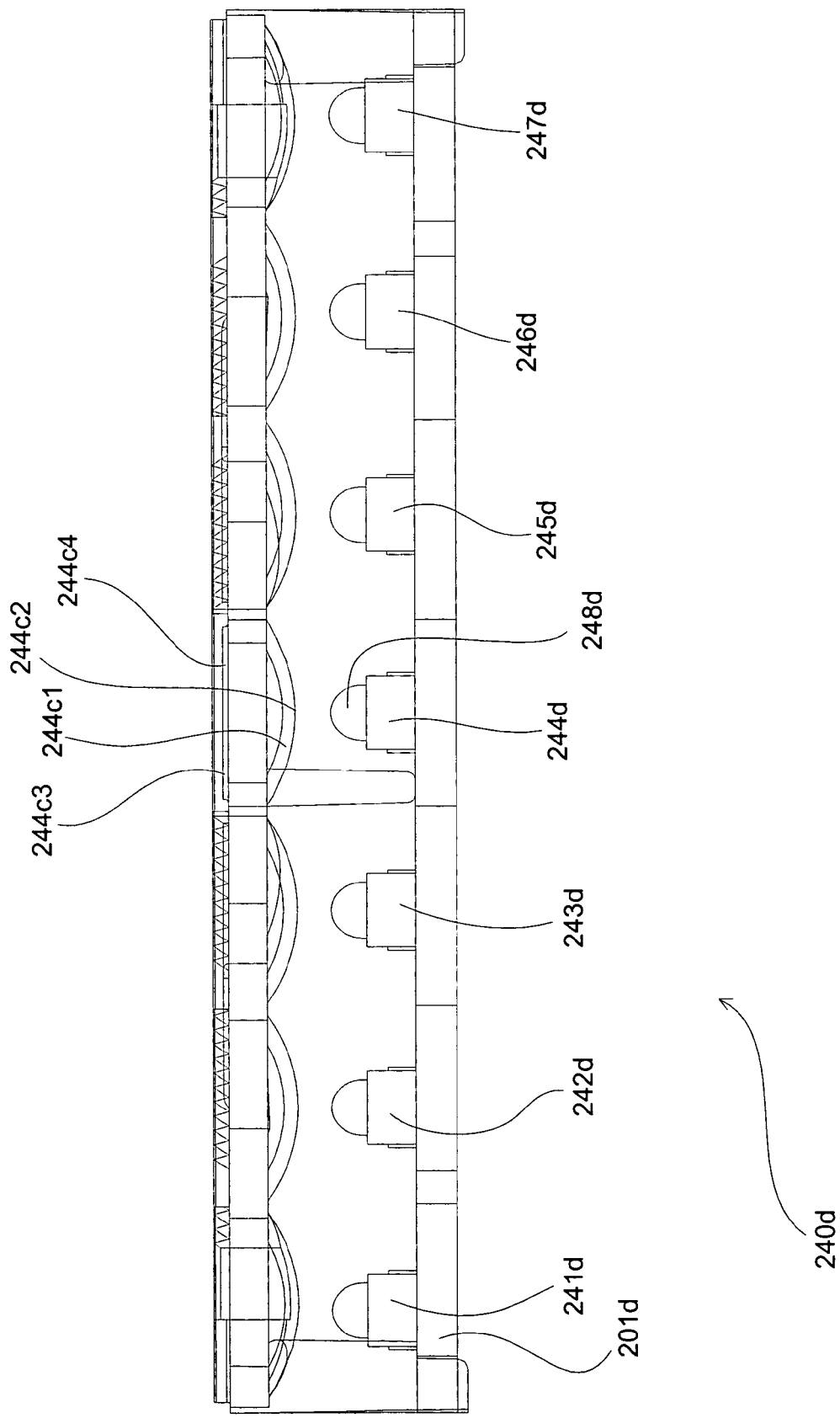
FIG. 2d depicts a profile view of the turn signal indicator of FIG. 2c.

Plan and profile views of a supplemental turning indicator assembly are shown in FIGS. 2c and 2d, respectively. The supplemental turning indicator assembly 240a, 240c, 240d comprises a first light source 241c, 241d; a second light source 242c, 242d; a third light source 243c, 243d; a fourth light source 244c, 244d; a fifth light source 245c, 245d; a sixth light source 246c, 246d and a seventh light source 247c, 247d. Preferably, each light source is a LA E63B, Power TOPLED®, available from OSRAM Corporation. It should be understood that any of the light sources described in commonly assigned U.S. Pat. Nos. 5,803,579 and 6,335,548, as well as U.S. patent application Ser. No. 09/835,278, the disclosures of which are incorporated in their entireties herein by reference, may be employed, the disclosures of each is incorporated in its entirety herein by reference. Preferably, each light source comprises a lens 248c, 248d. Each light source has an associated optics block comprising a first collimating portion 244c1, a first deviator portion 244c3, a second collimating portion 244c2 and a second deviator portion 244c4. Further details of related supplemental turning indicator assembly and optics blocks features are described in detail herein. It should be understood that more than one light source may be associated with a given optics block or multiple optics blocks may be associated with an individual light source. It should also be understood that multiple optics blocks may be incorporated into a common structure as shown in FIGS. 2c-2h. It should be understood that it is desirable to design the circuit board and optics block such that the light source is within 0.5 mm of a desired distance away from the optics block. In at least one embodiment, the optics block provides both vertical and horizontal light ray direction control. It should be understood that the optics blocks of the present invention may be incorporated individually for blind spot indicators, security lights, keyhole/door illuminators and other vehicle indicators, illuminators and information displays. It should be understood that the circuit board with light sources and other electrical components may be conformal coated and, or, the optics block may be configured such that it is ultrasonically, friction or vibratorilly welded, or otherwise sealingly adhered to the circuit board and configured to totally enclose the related electrical components of the supplemental turning indicator assembly.

Figure 2E:
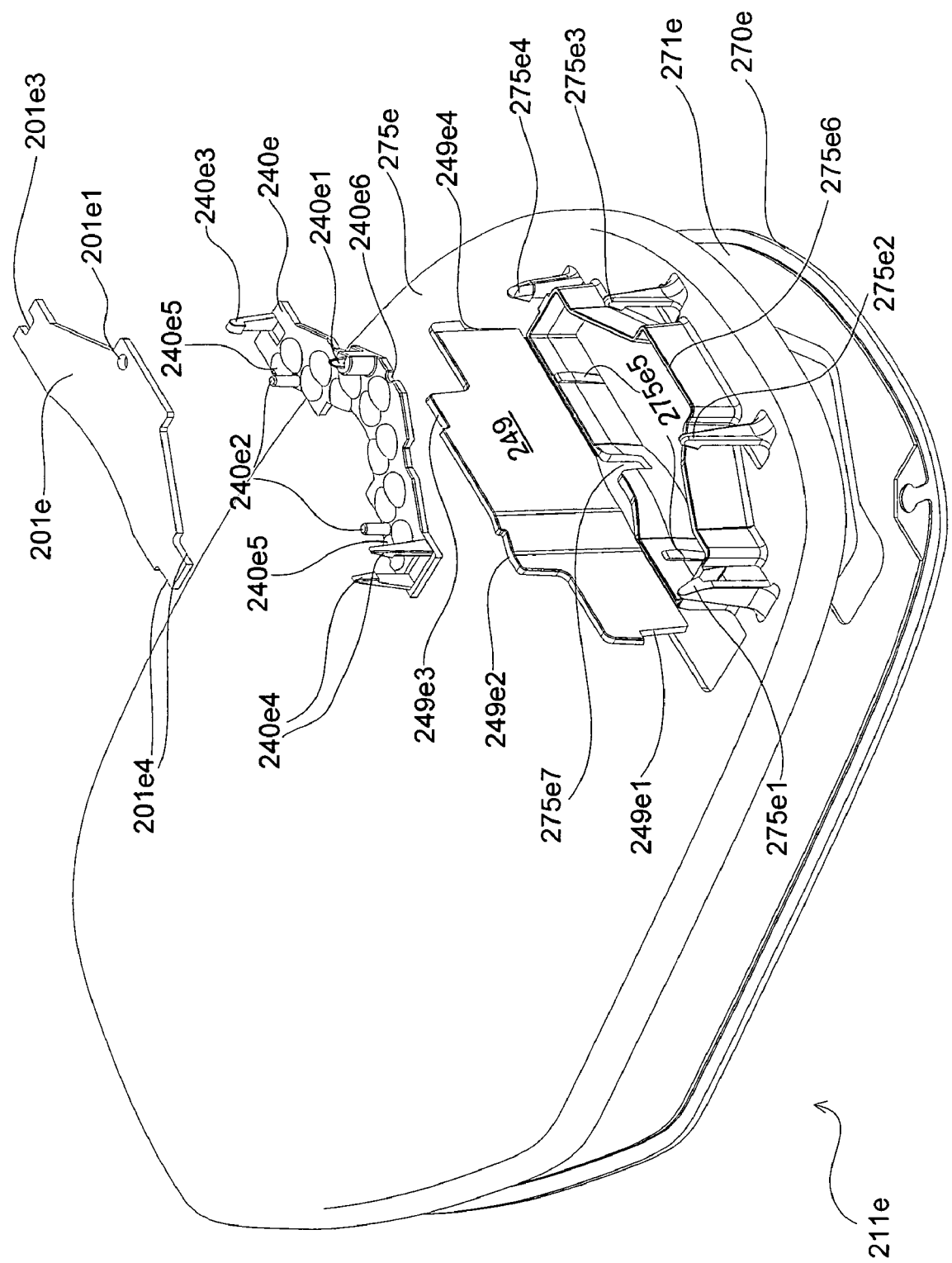
FIG. 2e depicts a perspective view of an exploded supplemental turning indicator assembly.
Figure 2F:
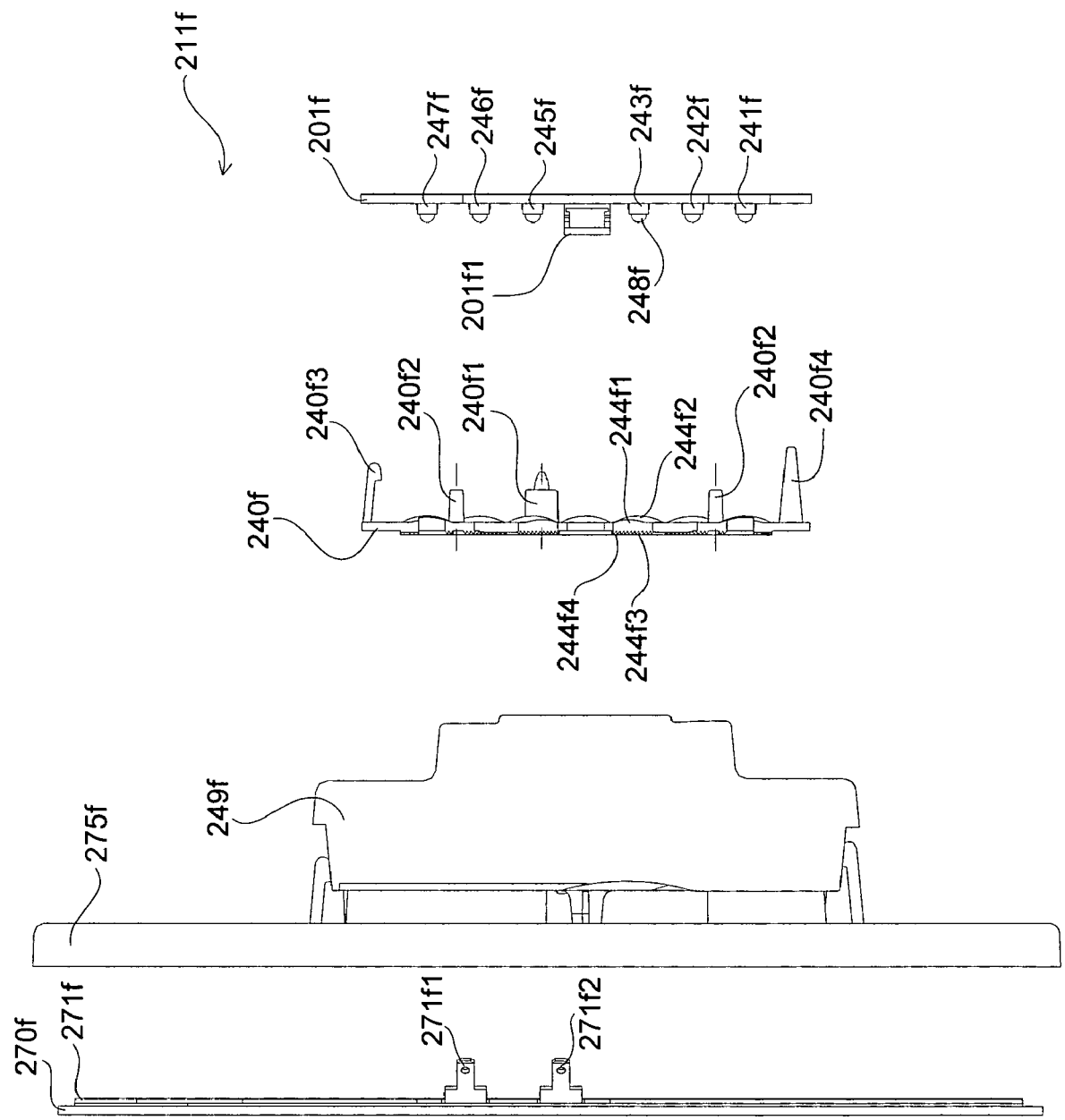
FIG. 2f depicts a profile view of the assembly of FIG. 2e.

With reference to FIGS. 2e and 2f, there is shown an embodiment of a rearview mirror assembly 211e, 211f comprising a supplemental turning indicator assembly. The supplemental turning indicator assembly comprises a printed circuit board 201e, 201f having an anti-rotation tab 201e4; an optics block alignment hole 201e1; an optics block alignment slot 201e3; first through seventh light sources 241f-247f and an electrical connector 201f1. Preferably, each light source has a lens 248f. The supplemental turning indicator assembly further comprises a combination optics block 240e, 240f having an alignment pin 240e1, 240f1; spacers 240e2, 240f2; anti-rotation clips 240e4, 240f4; an alignment slot clip 240e3, 240f3; optics block locators 240e5 and optics block positioner 240e6. Preferably, each optics block within the combination optics block 240e, 240f comprises a first collimating portion 244f1, a second collimating portion 244f2, a first deviator portion 244f3 and a second deviator portion 244f4. It should be understood that the optics block alignment hole cooperates with the alignment pin, the spacers cooperate with the circuit board, the alignment slot cooperates with the alignment slot clip and the anti-rotation tab cooperates with the anti-rotation clips to secure the circuit board in a desired relationship with respect to the combination optics block. It should be understood that accurate positioning of the light sources upon the circuit board is desirable to insure overall alignment with the associated optics block. It should also be understood that the optics block locators cooperate with the carrier locators 275e5 and the optics block positioner cooperates with the carrier positioner 275e6 to insure accurate alignment of the supplemental turning assembly with the carrier and ultimately with the heater, adhesive pad and corresponding mirror element. With further reference to FIGS. 2e and 2f, the rearview mirror assembly further comprises a carrier 275e, 275f having a living hinged lid 249e, 249f and first through fourth clips 275e1-275e4. The lid comprises first through fourth lid clip surfaces 249e1-249e4 that cooperate with the respective first through fourth clips to secure the supplemental turning indicator assembly within the carrier. A heater element 270e, 270f having first and second electrical connectors 271f1, 271f2, respectively, is positioned proximate the carrier along with adhesive 270e, 270f. In at least one embodiment, the heater comprises at least a portion aligned with the supplemental turning indicator assembly that comprises a light ray diffuser. Examples of various heaters are disclosed in U.S. Patent Nos. 5,151,824, 6,244,716, 6,426,485, 6,441,943 and 6,356,376, the disclosures of each of these Patents are incorporated in their entireties herein by reference.

Figure 2G:
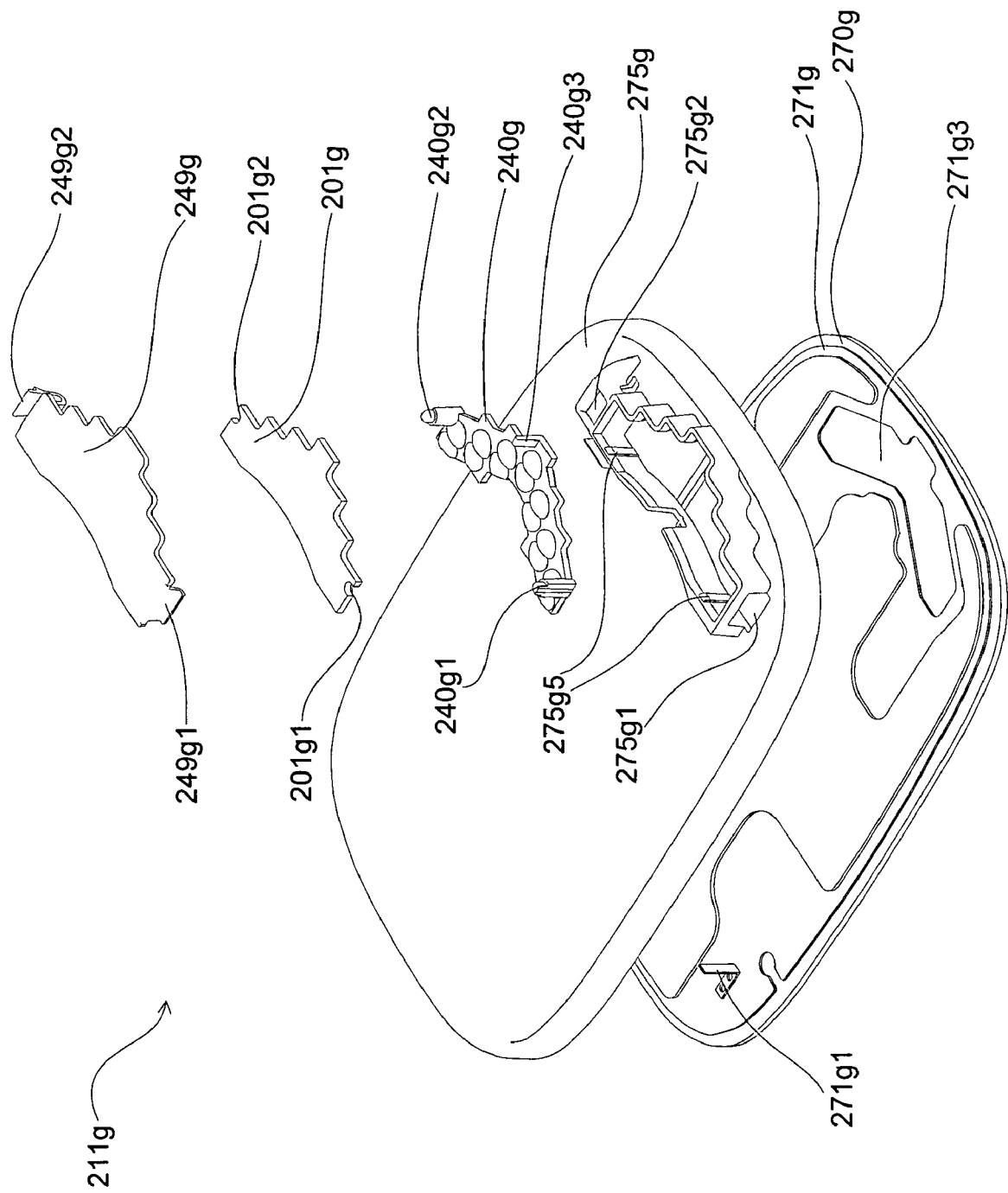
FIG. 2g depicts a perspective view of another exploded supplemental turning indicator assembly.
Figure 2H:
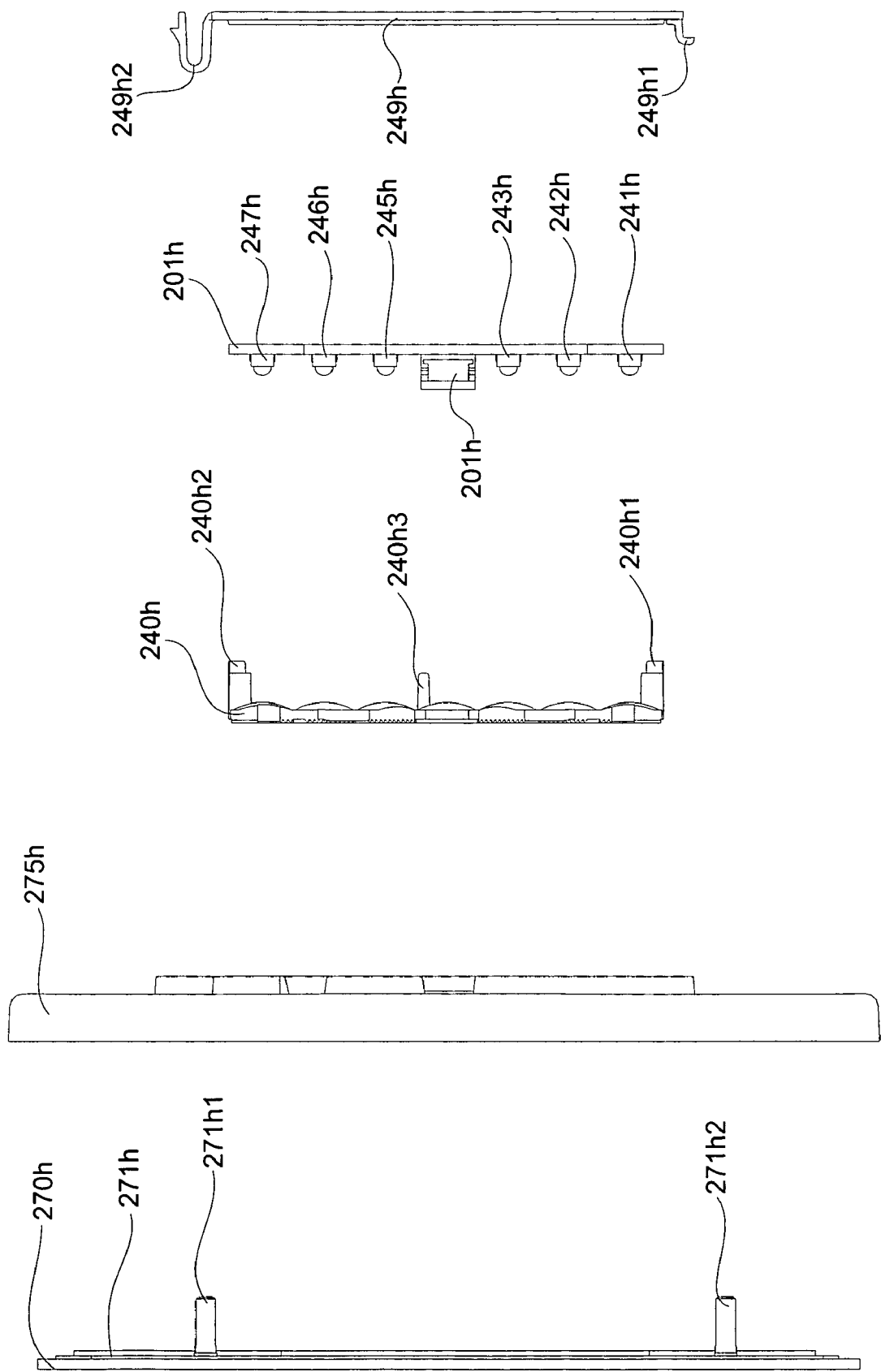
FIG. 2h depicts a profile view of the assembly of FIG. 2g.

With reference to FIGS. 2g and 2h, there is shown an embodiment of a rearview mirror assembly 211g, 211h comprising a supplemental turning indicator assembly. The supplemental turning indicator assembly comprises a printed circuit board 201g, 201h having an anti-rotation tab 201g1; an optics block alignment slot 201g2; first through seventh light sources 241h-247h and an electrical connector 201h1. The supplemental turning indicator assembly further comprises a combination optics block 240g, 240h having an anti-rotation pin 240g1, 240h1; a spacer 240g3, 240h3 and an alignment pin 240g2, 240h2; It should be understood that the spacer cooperates with the circuit board, the alignment slot cooperates with the alignment pin and the anti-rotation tab cooperates with the anti-rotation pin to secure the circuit board in a desired relationship with respect to the combination optics block. It should be understood that accurate positioning of the light sources upon the circuit board is desirable to insure overall alignment with the associated optics block. It should also be understood that the optics block locators cooperate with the carrier locators 275g5 to insure accurate alignment of the supplemental turning assembly with the carrier and ultimately with the heater, adhesive pad and corresponding mirror element. With further reference to FIGS. 2g and 2h, the rearview mirror assembly further comprises a carrier 275g, 275h having first and second clips 275g1-275g2. The lid 249g, 249h comprises first and second lid clips 249g1-249g2 that cooperate with the respective first and second clips to secure the supplemental turning indicator assembly within the carrier. A heater element 270g, 270h having first and second electrical connectors 271, g1271h1, 271h2, respectively, is positioned proximate the carrier along with adhesive 270g, 270h. In at least one embodiment, the heater comprises at least a portion aligned with the supplemental turning indicator assembly that comprises a light ray diffuser. Examples of various heaters are disclosed in U.S. Pat. Nos. 5,151,824, 6,244,716, 6,426,485, 6,441,943 and 6,356,376, the disclosures of each of these Patents are incorporated in their entireties herein by reference.

Figure 3A:
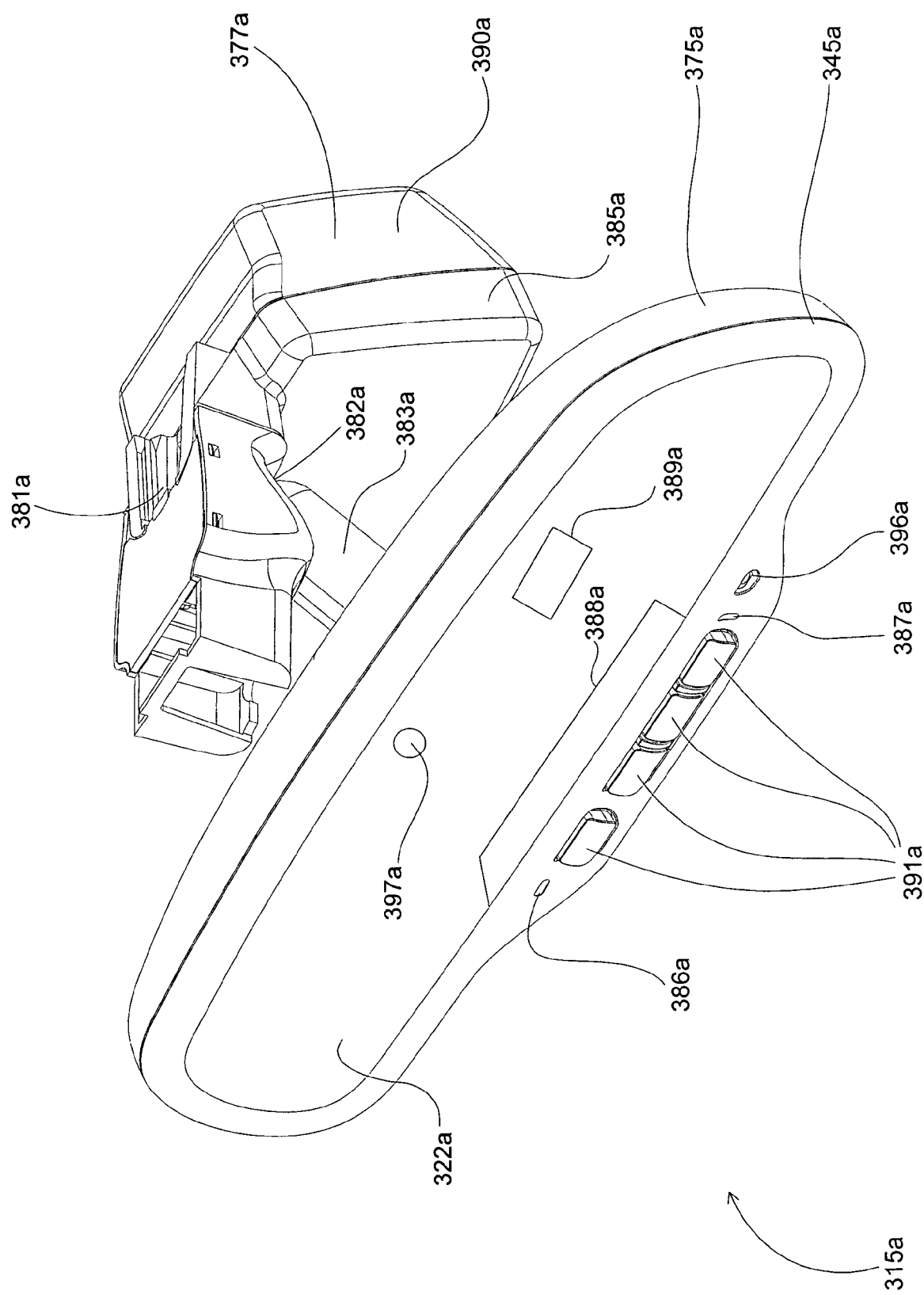
FIG. 3a depicts a perspective view of an interior rearview mirror assembly.
Figure 3B:
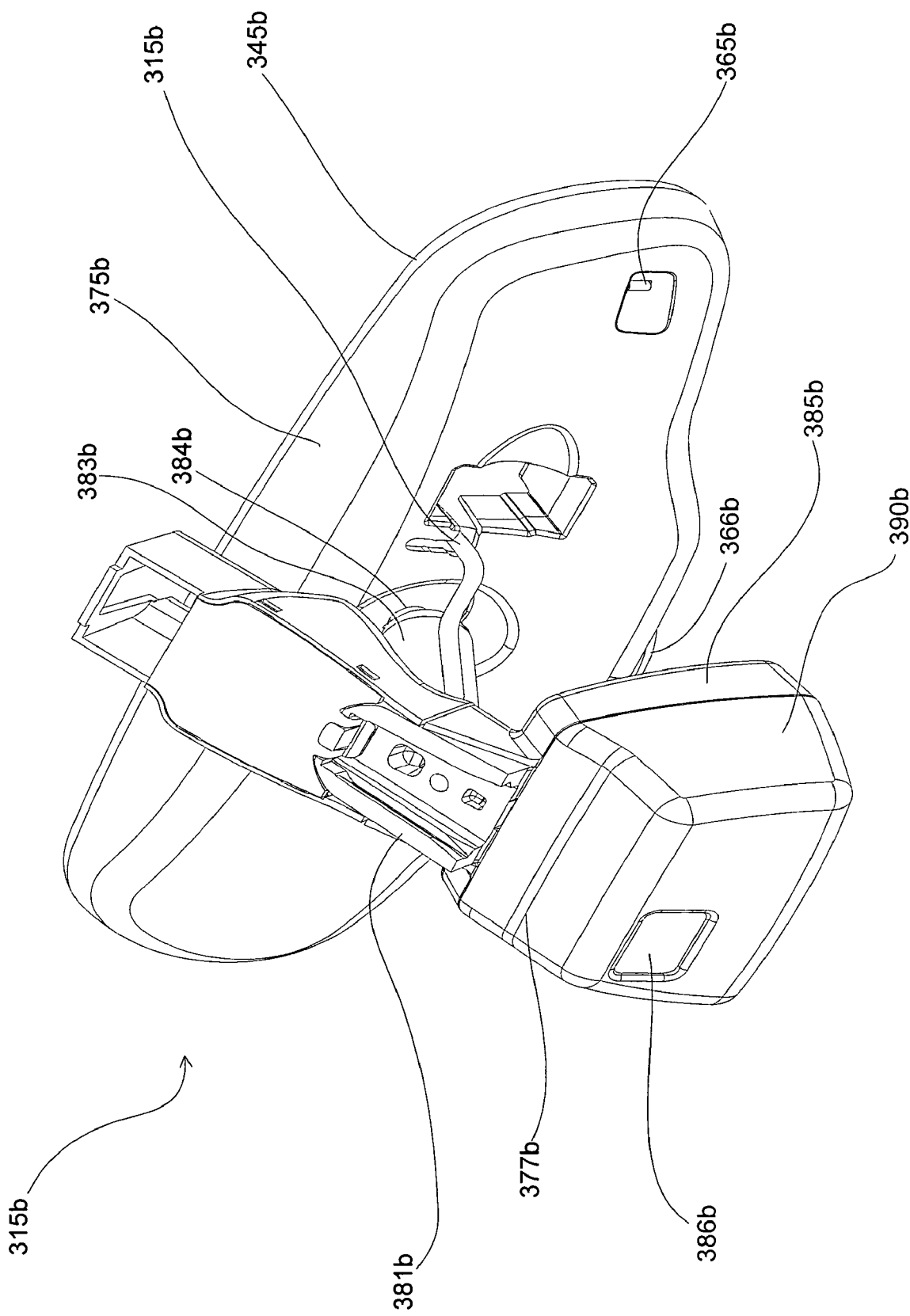

Turning now to FIGS. 3a and 3b a rearview mirror assembly 315a, 315b comprises a stationary housing 377a, 377b and a mirror housing 375a, 375b mounted to an attachment member 381a, 381b via a double ball stem 382a, 383a, 383b, 384b. The stationary housing comprises a rear portion 385a, 385b and a front portion 390a, 390b having a viewing window 386b. In at least one embodiment, the stationary housing comprises at least one imager, at least one automatic exterior light control module, at least one moisture sensor module, at least one compass sensor, at least one compass, at least one speaker, at least one microphone, at least one windshield wiper automatic control, at least one digital signal processor, at least one automatic defogger control, at least one collision avoidance control, at least one lane departure warning module, at least one electro-optic mirror element control module, at least one supplemental illuminator module, at least one photo sensor, at least one processor, any one thereof, a subcombination thereof or combination thereof. Preferably, the mirror assembly comprises a mirror element 322a and a bezel 345a, 345b. In at least one embodiment, the mirror housing comprises at least one imager, at least one automatic exterior light control module, at least one moisture sensor module, at least one compass sensor, at least one compass, at least one speaker, at least one microphone, at least one windshield wiper automatic control, at least one digital signal processor, at least one digital sound processor, at least one GPS system, at least one navigation system, at least one automatic defogger control, at least one collision avoidance control, at least one lane departure warning module, at least one electro-optic mirror element control module, at least one supplemental illuminator module, at least one photo sensor, at least one processor, any one thereof, a subcombination thereof or combination thereof. Preferably, the mirror assembly further comprises at least one ambient light sensor 365b, at least one microphone 366b and at least one interconnecting cable 315b for electrical communication from the mirror housing to the stationary housing. It should be understood that a second interconnecting cable may be provided for electrical communication from the mirror assembly to the vehicle and, or, at least one other rearview mirror assembly. The interconnecting cable, or cables, may be configured to route, at least partially, through the double ball stem, therefore, are at least partially covert. Preferably, the mirror assembly comprises at least one information display 388a, 389a, a first indicator 386a, at least a second indicator 387a, at least one glare light sensor 396a, at least one second glare sensor 397a, an illuminator, any one thereof, a subcombination thereof or combination thereof. In at least one embodiment, at least one indicator, illuminator, information display, photo sensor, subcombination thereof or combination thereof is positioned behind the mirror element with respect to a viewer. It should be understood that the optics blocks described herein may be employed with any of these device to control the direction of the associated light rays. Exterior light control systems as described in commonly assigned U.S. Pat. Nos. 5,990,469; 6,008,486; 6,130,421; 6,130,448; 6,255,639; 6,049,171; 5,837,994; 6,403,942; 6,281,632; 6,291,812; and U.S. patent application Ser. Nos. 09/448,364; 09/538,389; 09/605,102; 09/678,856; 09/800,460; 09/847,197; 09/938,774; 09/491,192; 60/404,879; 10/235,476; and 10/208,142, the disclosures of which are incorporated in their entireties herein by reference, may be incorporated in accordance with the present invention. Examples of microphones for use with the present invention are described in commonly assigned U.S. patent application Ser. Nos. 09/144,176 and 10/076,158, the disclosures of which are incorporated in their entireties herein by reference. Various indicators for use with the present invention are described in commonly assigned U.S. Pat. Nos. 5,803,579 and 6,335,548, as well as commonly assigned U.S. patent application Ser. No. 09/835,278, the disclosures of which are incorporated in their entireties herein by reference. Preferred light sensors for use within the present invention are described in detail in commonly assigned U.S. Pat. Nos. 5,923,027 and 6,313,457, the disclosures of which are incorporated in their entireties herein by reference. The details of various control circuits for use herewith are described in commonly assigned U.S. Pat. Nos. 5,956,012; 6,084,700; 6,222,177; 6,224,716; 6,247,819; 6,249,369; 6,392,783; and 6,402,328, the disclosures of which are incorporated in their entireties herein by reference. It should be understood that the mirror assembly may incorporate light-sensing electronic circuitry of the type illustrated and described in the above-referenced Canadian Patent No. 1,300,945, U.S. Pat. No. 5,204,778, U.S. Pat. No. 5,451,822, U.S. Pat. No. 6,402,328, or U.S. Pat. No. 6,386,713 and other circuits capable of sensing glare and ambient light and supplying a drive voltage to the electro-optic element, the disclosures of which are incorporated in their entireties herein by reference. Moisture sensors and windshield fog detector systems are described in commonly assigned U.S. Pat. Nos. 5,923,027 and 6,313,457, the disclosures of which are incorporated in their entireties herein by reference.

Figure 4A:
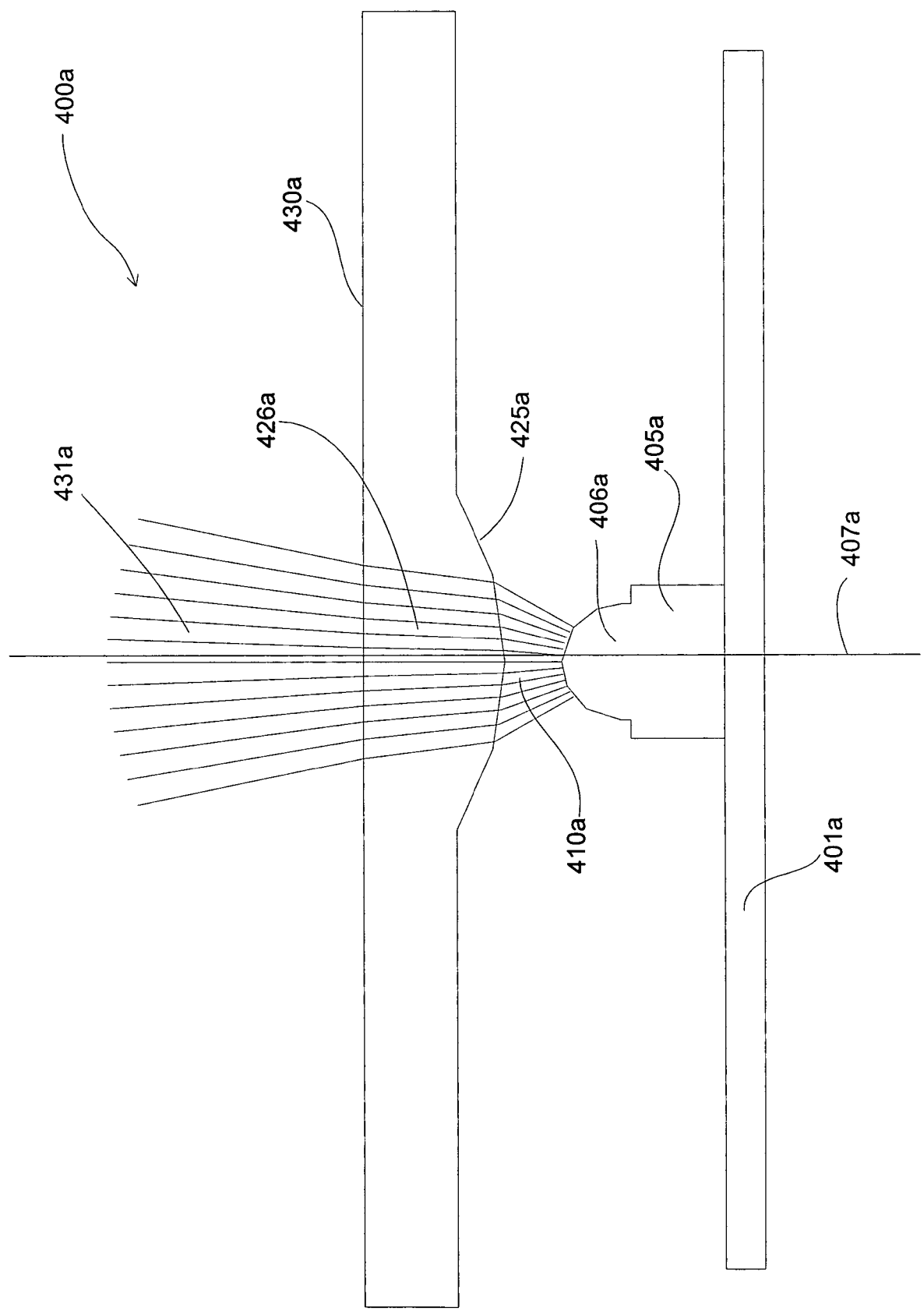
FIG. 4a depicts an indicator assembly.
Figure 4B:
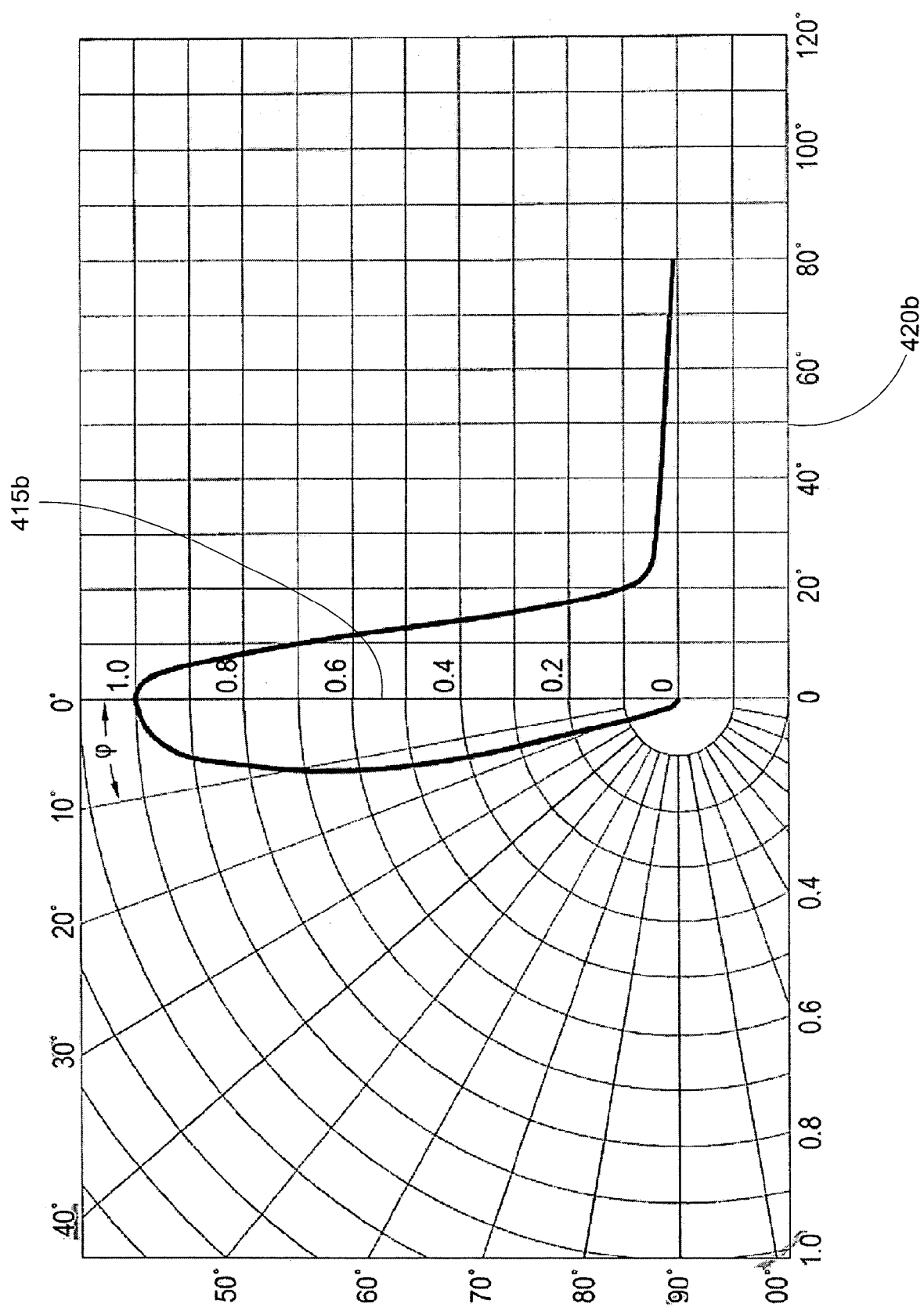
FIG. 4b depicts a graph of a light source radiation characteristic.

Turning now to FIGS. 4a and 4b, a light source 405a, having a lens 406a, is depicted to be mounted to a circuit board 401a. A typical light source will emit light rays 410a in a pattern as depicted. The x-axis of FIG. 4b represents the angular viewing position relative to the central optical axis of the light source and the y-axis represents a normalized radiation characteristic of the light source. As can be seen, light rays emitted by a typical light source will be minimally visible beyond some given viewing angle with respect to a central optical axis 407a. Preferably, an optics block is provided with a concentrating portion 425a to redirect light rays 410a to substantially concentrated light rays 426a. In at least one embodiment, the optics block comprises a deviator portion 430a to redirect light rays 426a to a desired light ray 431a direction. As can be seen, the optics block of FIG. 4a may be incorporated in a rearview mirror indicator assembly, illuminator assembly or information display assembly to control the vertical direction of light rays in a condensing fashion. The light source, circuit board and optics block form a light assembly 400a. In at least one embodiment, the optics block is configured to direct substantially all of the associated light rays to define a vertical viewing angle approximately −5° and approximately 5° (+approximately 4° to approximately 5°/−approximately 2° to approximately 3°) with respect to a central optical axis.

Figure 5:
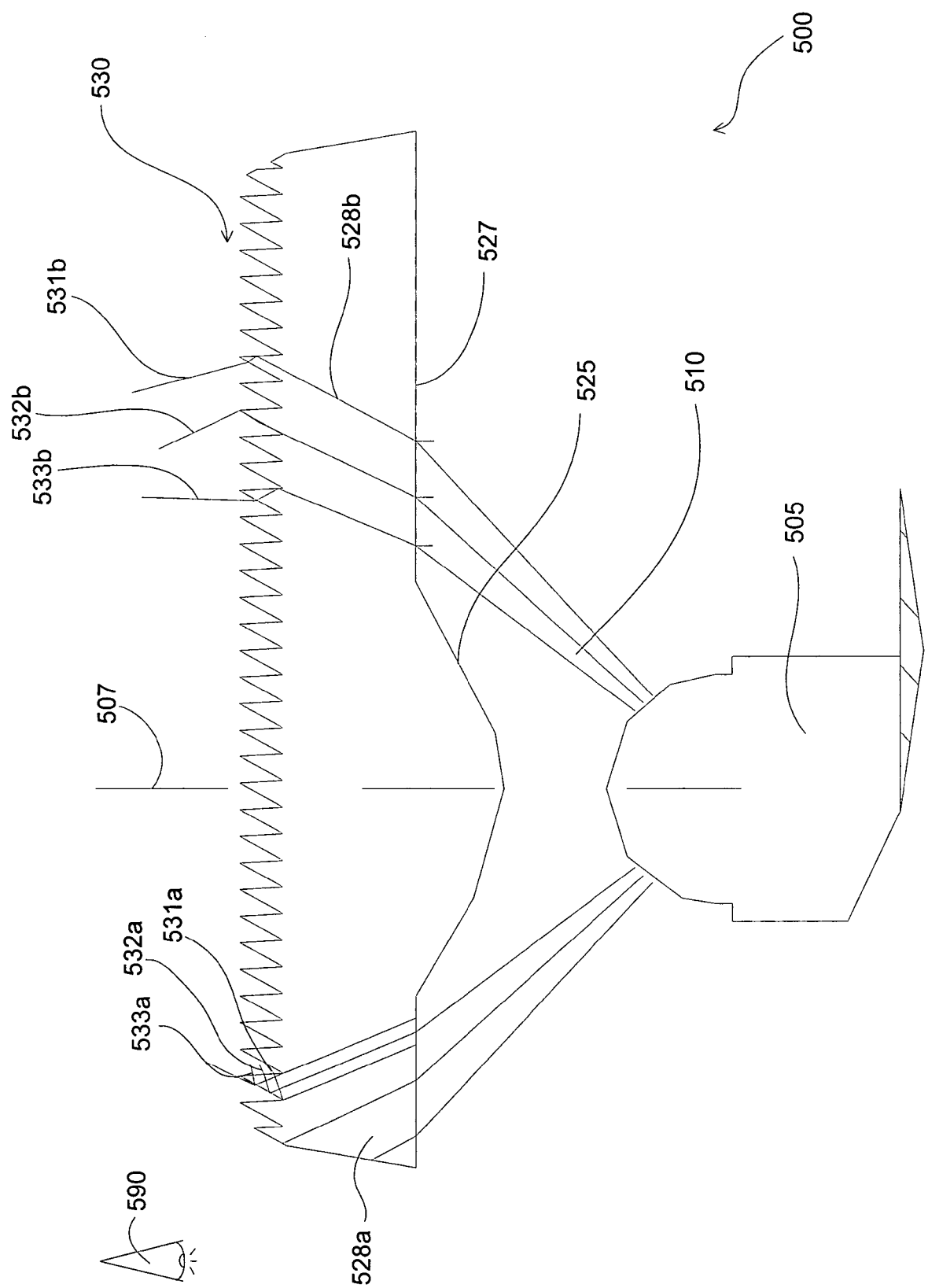
FIG. 5 depicts a light ray tracing.
Figure 6:
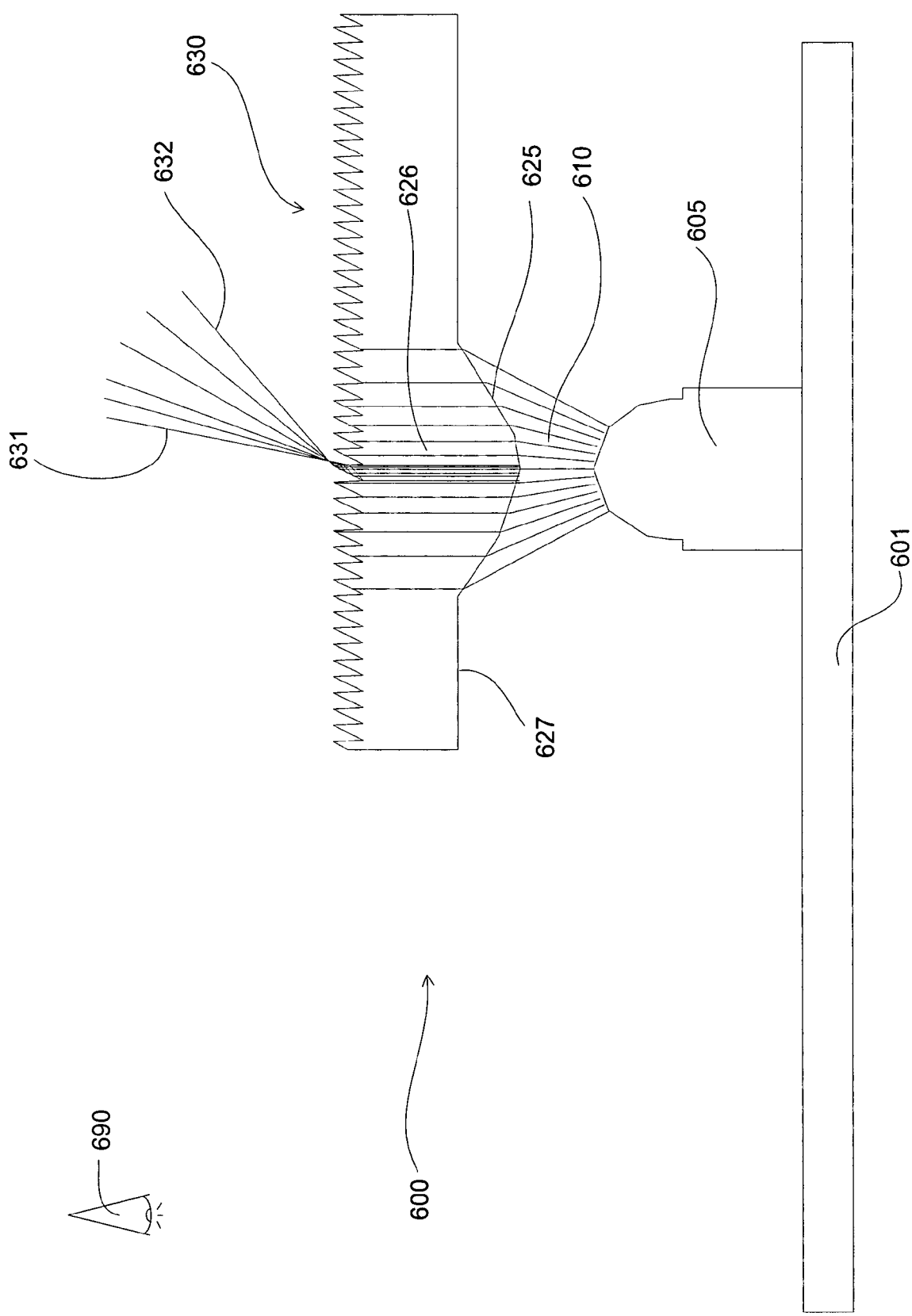
FIG. 6 depicts a second light ray tracing.

Turning now to FIGS. 5 and 6, there is shown a light source 505, 605 mounted to a circuit board 601 to define a central optical axis 507. An optics block incorporating a collimating portion 525, 625 and a deviator portion 530, 630 is provided to control the direction of the light rays preferably away from the driver's eye 590, 690. As can be seen, the light rays 626 that pass through the collimating portion are redirected substantially parallel to the central optical axis, however, light rays 528a, 528b that pass through the non-collimating portion 527, 627 are not so redirected. As can be seen, the light rays 528a result in reflected light rays 531a, 532a, 533a directed toward an undesirable portion of deviator surface 530. Similarly, light rays 528b are reflected and refracted light rays 531b, 532b, 533b directed toward an undesirable direction. Some of the light rays 510, 610 are actually directed toward the driver's eye. It should be understood that secondary optics blocks may be added to further redirect the light rays 528a, 528b. With further reference to FIG. 6, it can be seen that the light rays 626 that have been redirected substantially parallel to the central optical axis result in light rays 631, 632 that are redirected substantially as desired. As can be appreciated, this configuration does not result in a majority of the light rays emitted from the light source being redirected as desired. The light source 505, 605; circuit board 601 and the optics block form a light assembly 500, 600. In at least one embodiment, the collimating portion collimates light rays horizontally and redirects (concentrates) light rays vertically. Preferably, total internal reflections (TIR) optics form light rays horizontally in the outboard direction relative to the controlled vehicle. In at least one embodiment, the optics block is configured to direct substantially all of the associated light rays to define a vertical viewing angle approximately −5° and approximately 5° (+approximately 4° to approximately 5°/−approximately 2° to approximately 3°) with respect to a central optical axis. In at least one embodiment, a minimum of approximately 5 candelas are present at approximately 5°, approximately 4 candelas at approximately 10° and approximately 3 candelas at approximately 15°, all angles with respect to a central optical axis.

Figure 7:
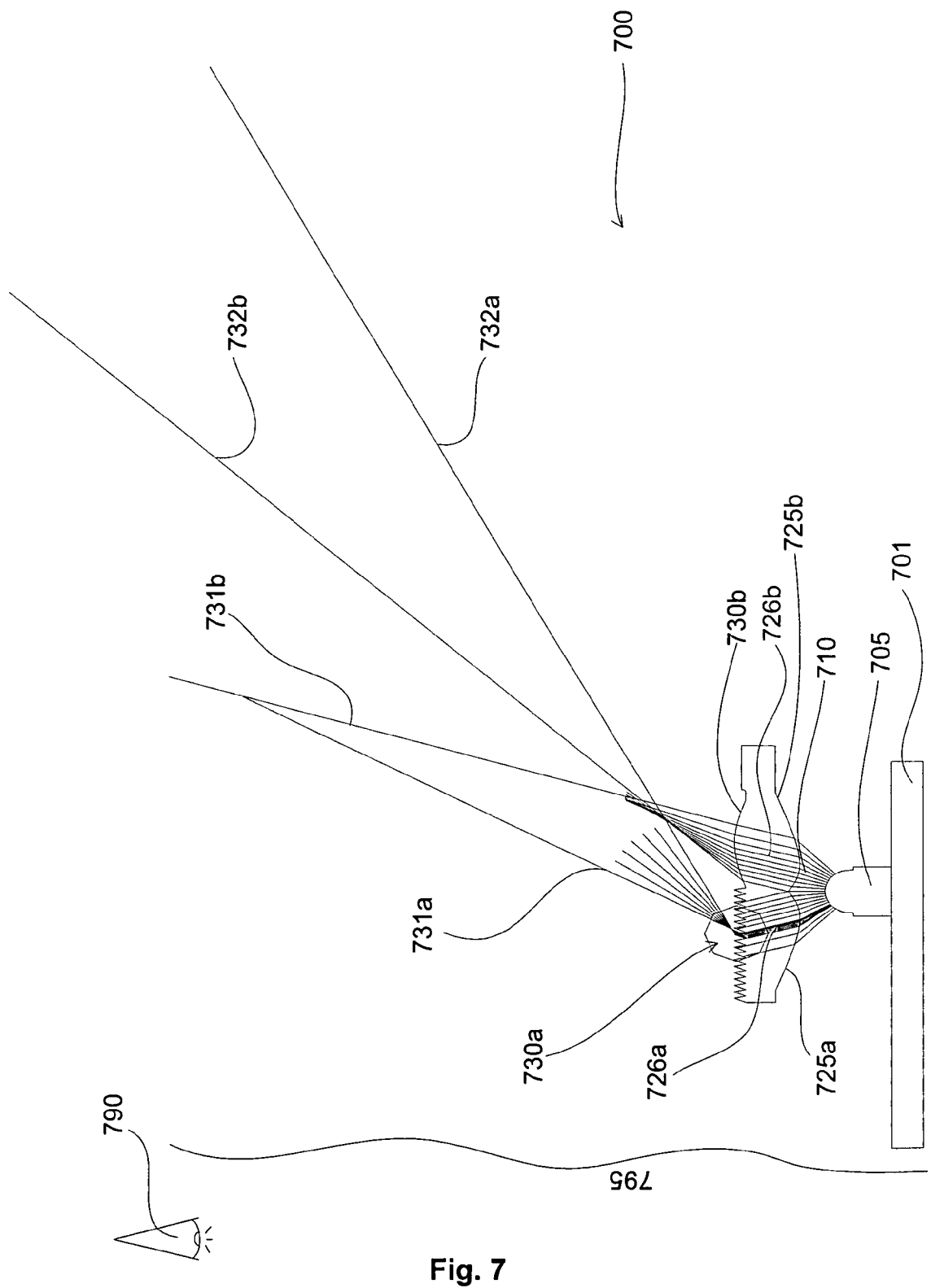
FIG. 7 depicts a third light ray tracing.

With reference to FIG. 7, a light source 705 is mounted to a circuit board 701 such that light rays 710 are emitted toward an optics block. Preferably, the optics block comprises a first collimating portion 725a to redirect a portion of the light rays 710 as partially collimated light rays 726a toward a first deviator portion 730a resulting in light rays 731a, 732a. Preferably, the optics block comprises a second collimating portion 725b to redirect a portion of the light rays 710 as partially collimated light rays 726b toward a second deviator portion 730b resulting in light rays 731b, 732b. As can be seen, substantially all of the light rays emitted from the light source are redirected as desired away from the driver's eye 790 and toward a blind spot. The light source, the circuit board and the optics block form a light assembly 700. Preferably, the first collimating portion 725a directs partially collimated light rays 726a approximately 15° inboard, toward, the controlled vehicle 795 with respect to the central optical axis of the associated light source. The first collimating portion may be configured as a curved lens surface defining either a radial, an elliptical, a hyperbolic, a parabolic or a complex shape. As described in more detail elsewhere herein, the first deviator portion 730a is preferably configured to refract substantially all of the partially collimated light rays 726a approximately 45° (+/−approximately 17°) outboard, away, from the controlled vehicle with respect to the central optical axis of the associated light source. Preferably, the second collimating portion 725b directs partially collimated light rays 726b approximately 15° outboard, away, from the controlled vehicle with respect to the central optical axis of the associated light source. The second collimating portion may be configured as a curved lens surface defining either a radial, an elliptical, a hyperbolic, a parabolic or a complex shape. The second deviator portion 730b is preferably configured to redirect substantially all of the partially collimated light rays 726b approximately 29° (+/−approximately 14°) outboard, away, from the controlled vehicle with respect to the central optical axis of the associated light source. These two groups of light rays combine to define a beam pattern that is approximately 32° (+approximately 15°/−approximately 10°) with respect to a central optical axis.

Figure 8:
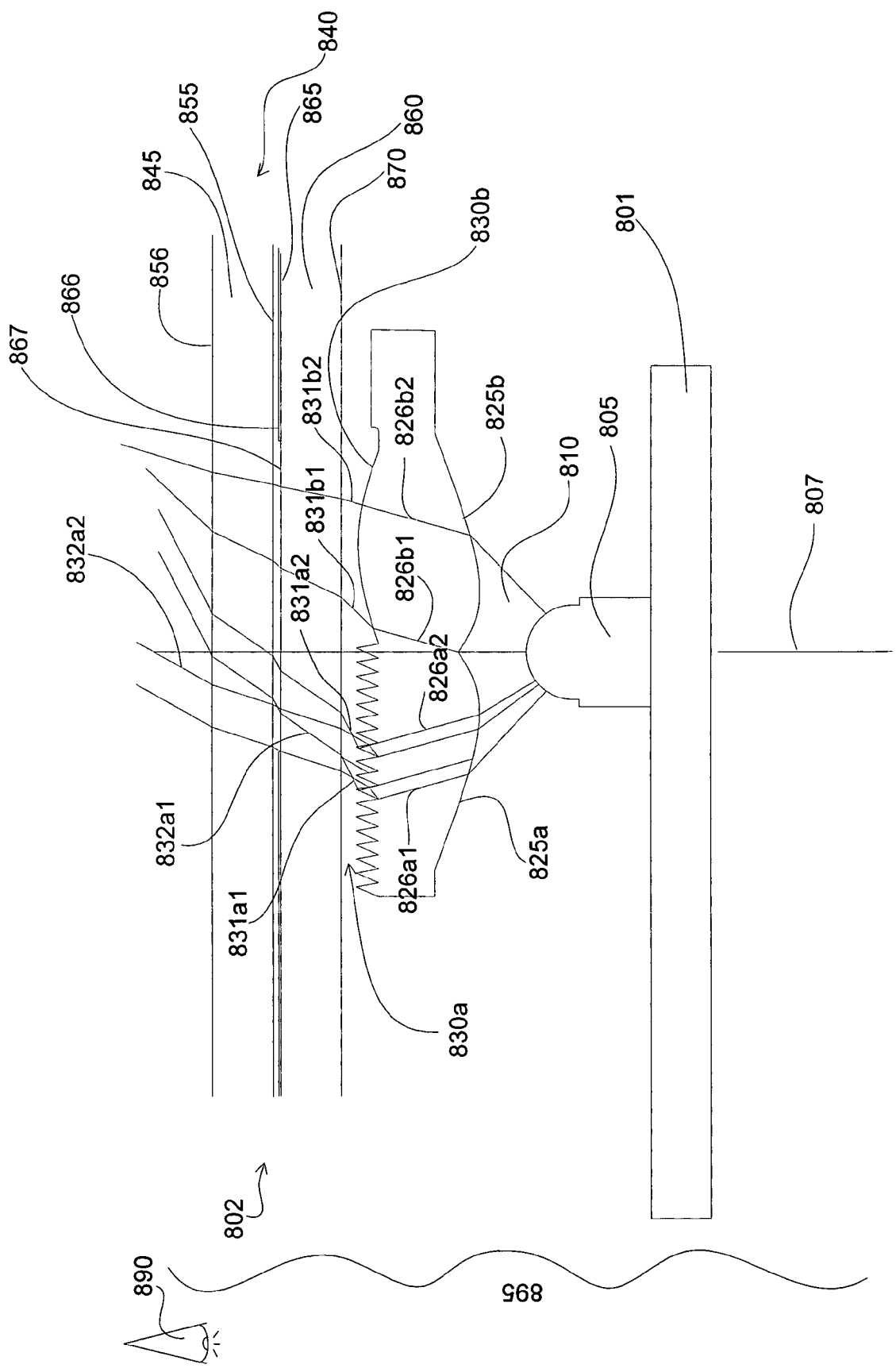
FIG. 8 depicts a forth light ray tracing.

Turning now to FIG. 8, a mirror assembly 802 is depicted to comprise a light assembly comprising a light source 805, a circuit board 801 and an optics block similar to that shown in FIG. 7. In this embodiment, a portion of the light rays 810 are redirected via a first collimating portion 825a to form at least partially collimated light rays 826a1, 826a2. Light rays 826a1 are redirected by a first deviator portion 830a to form light rays 831a1, 832a1. Light rays 826a2 are redirected by the first deviator to form light rays 831a2, 832a2. A portion of the light rays 810 are redirected via a second collimating portion 825b to form light rays 826b1, 826b2. Light rays 826b1 are redirected via a second deviator portion 830b to form light rays 831b1. Light rays 826b2 are redirected via the second deviator portion to form light rays 831 b2. Preferably, substantially all of the light rays 810 emitted by the light source pass through the area 867 defined in an associated mirror element 840 reflective stack 866. Preferably, the mirror element further comprises a first substrate 845, having a first surface 850 and a second surface 855, and a second substrate 860, having a third surface 865 and a fourth surface 870. It should be understood that in at least one embodiment, the mirror element is a prismatic mirror comprising a single substrate through which the associated light rays pass. As can be seen, the majority of the light rays 810 are directed outboard of the controlled vehicle 895 and away from the driver's eye 890. In at least one embodiment, the area 867 defines a window having a higher transmissivity than the remainder of the reflective stack 866. With this window configuration in combination with aligning the light source and optics block as depicted in FIG. 8 and described with regard to FIGS. 2e02h, approximately half of the first deviator portion 830a is out of alignment with respect to the window area. Since the second collimating portion and the second deviator portion direct substantially all of the related light rays 826b1, 826b2, 831b1, 831b2 outboard, away, from the controlled vehicle and the half of the first collimating portion. Combined with the first deviator portion, most susceptible to producing stray light rays, being out of alignment with respect to the window, very little, if any, light rays 826a1, 826a2, 831b1, 831b2 are visible to the driver of the controlled vehicle. It should be understood that substantially the entire reflective stack 866, including the area 867, may be configured to be similarly, if not identically, at least partially transmissive, may have alternating areas of differing transmissivity in the area 867, or may comprise any of the configurations as described in commonly assigned U.S. Pat. Nos. 5,682,267, 5,689,370, 6,064,509, 6,062,920, 6,268,950, 6,195,194, 5,940,201, 6,246,507, 6,057,956, 6,512,624, 6,356,376, 6,166,848, 6,111,684, 6,193,378, 6,239,898, 6,441,943, 6,037,471,6,020,987, 5,825,527, 6,111,684 and 5,998,617, the disclosures of each of these Patents are incorporated in their entireties herein by reference.

Figure 9:
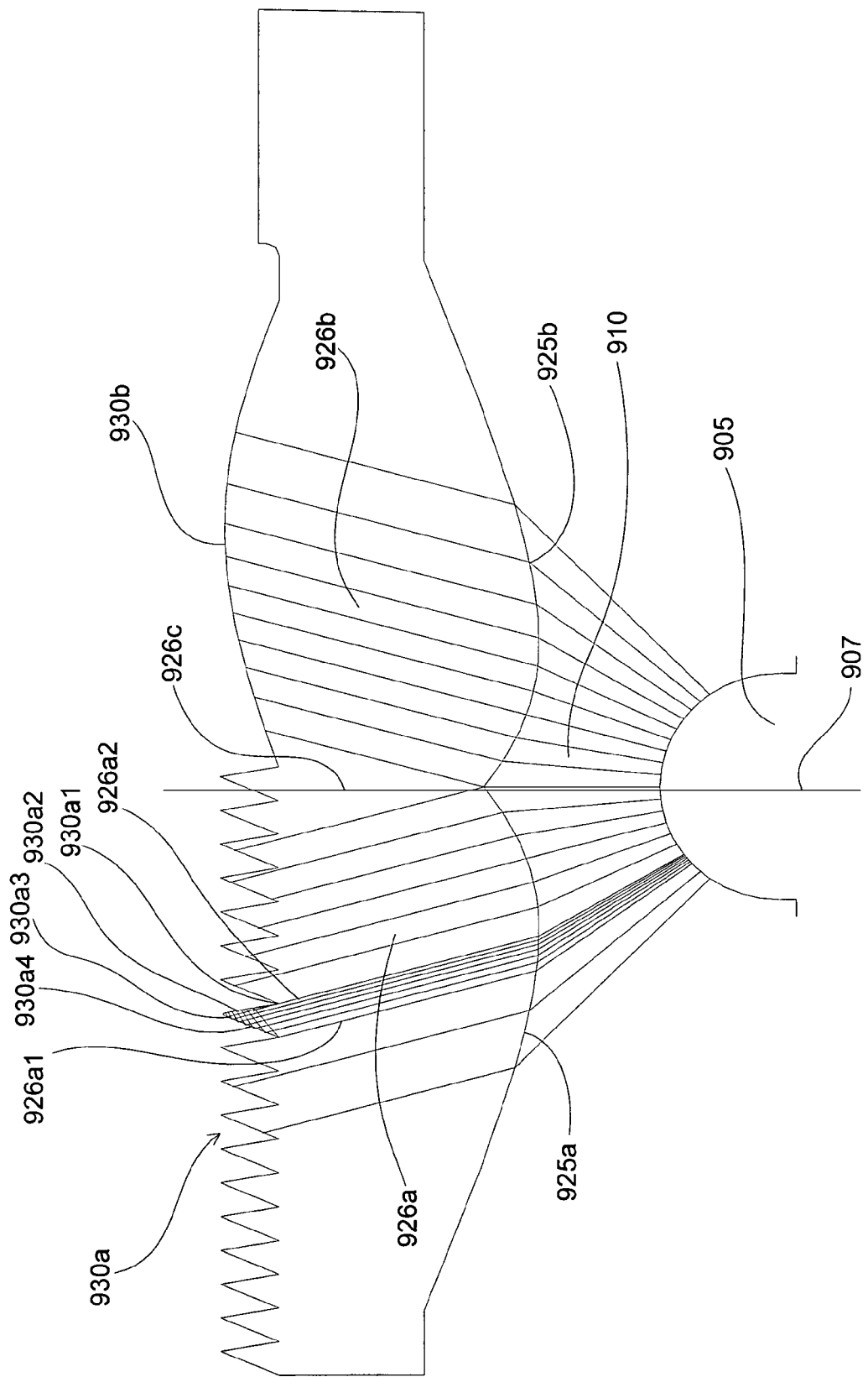
FIG. 9 depicts a portion of the light ray tracing of FIG. 7.

With reference to FIG. 9, there is shown a light source 905 in relation to an optics block similar to those shown in FIGS. 7 and 8. The optics block comprises a first collimating portion 925a configured to redirect a portion of light rays 910 as partially collimated light rays 926a. In at least one embodiment, the angle defined by the first deviator segment 930a2 with respect to the central optical axis 907 is less than the angle of the partially collimated light rays 926a1, 926a2, such that the portion of partially collimated light rays 926a that pass deviator edge 930a1 do not impinge on the second deviator segment 930a3 and are reflected by the third deviator segment 930a4 and refracted by the first deviator segment 930a2. Preferably, as described in detail elsewhere herein, deviator segment 930a4 forms an angle with respect to the central optical axis 907 such that even light rays 926a1 clear adjoining deviator segments and edges. In a preferred embodiment, a null zone 926c is defined to minimize light ray cross-over from the second collimating portion to the first deviator portion and from the first collimating portion to the second deviator portion.

Figure 10:
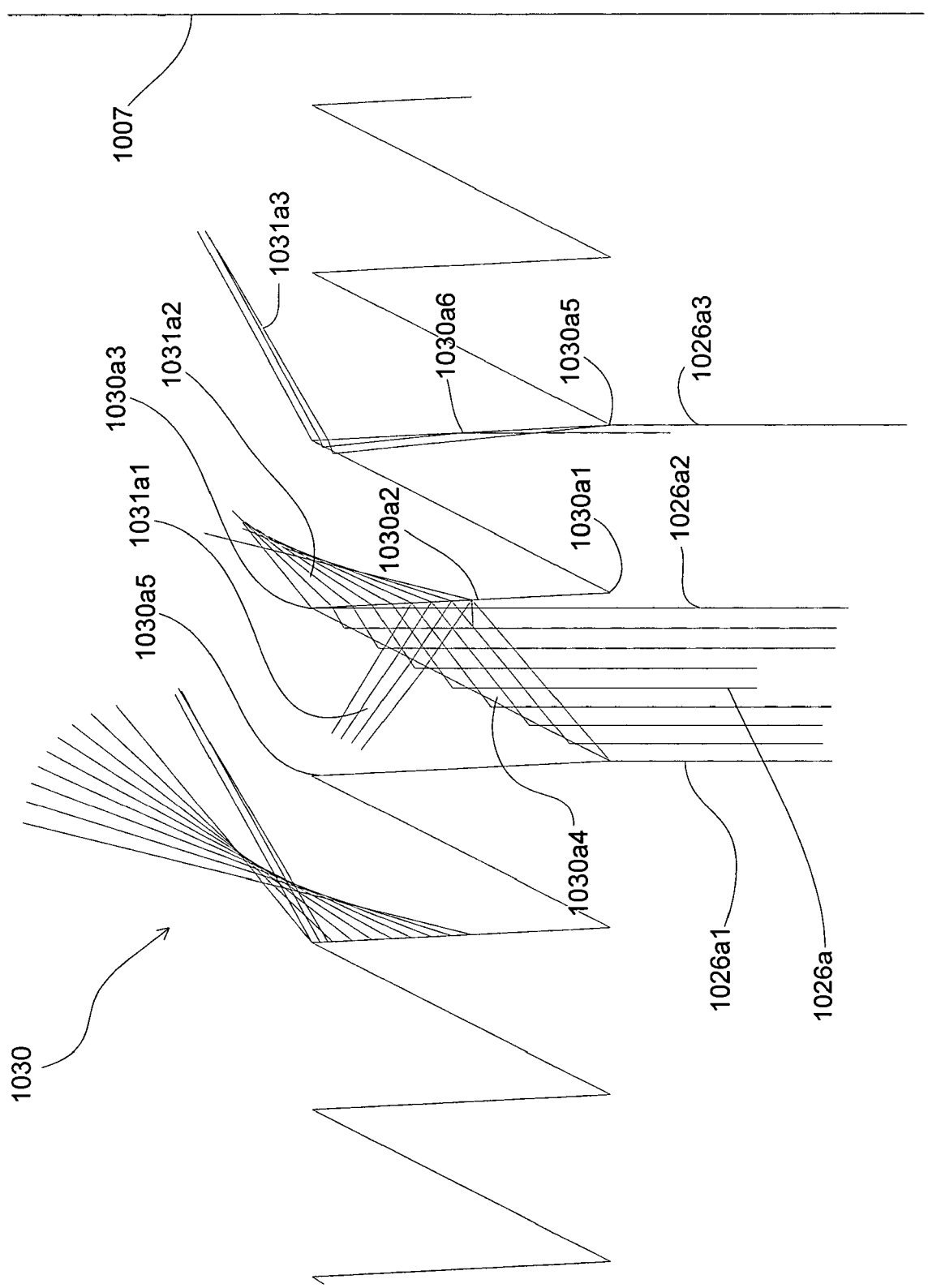
FIG. 10 depicts a magnified view of various light ray tracing details.

Turning now to FIG. 10, there is shown an enlarged view of a portion of a first deviator portion 1030. As can be seen in this embodiment, the angle defined by the first deviator segment 1030a2 with respect to the central optical axis 1007 is greater than the angle defined by the partially collimated light rays 1026a resulting in the light rays 1026a3 passing the adjoining deviator edge 1030a5 and impinging upon the adjoining second deviator segment 1030a6, resulting in stray light rays 1031a3. This configuration causes a significant amount of the associated light rays to be reflected off the first deviator segment (preferably, refracting surface) 1030a2, through the third deviator segment (preferably, reflecting surface) 1030a4, inboard toward the driver of the controlled vehicle. Light rays may be bounced off refracting surfaces, off reflecting surfaces and then refract outboard, away, from the controlled vehicle at a greater angle than desired. As well known, when light rays 1026a approach the angle of total internal reflection (TIR), the light rays are refracted and reflected according to the Fresnel equations. The configuration depicted in FIG. 10, with its relatively wide deviator pattern, results in a portion of the partially collimated light rays 1026a are reflected off segment 1030a4 toward segment 1030a2. These light rays are close to a TIR angle, reflected light rays 1031a1 will impinge upon the adjoining first deviator segment 1030a5.

Figure 11:
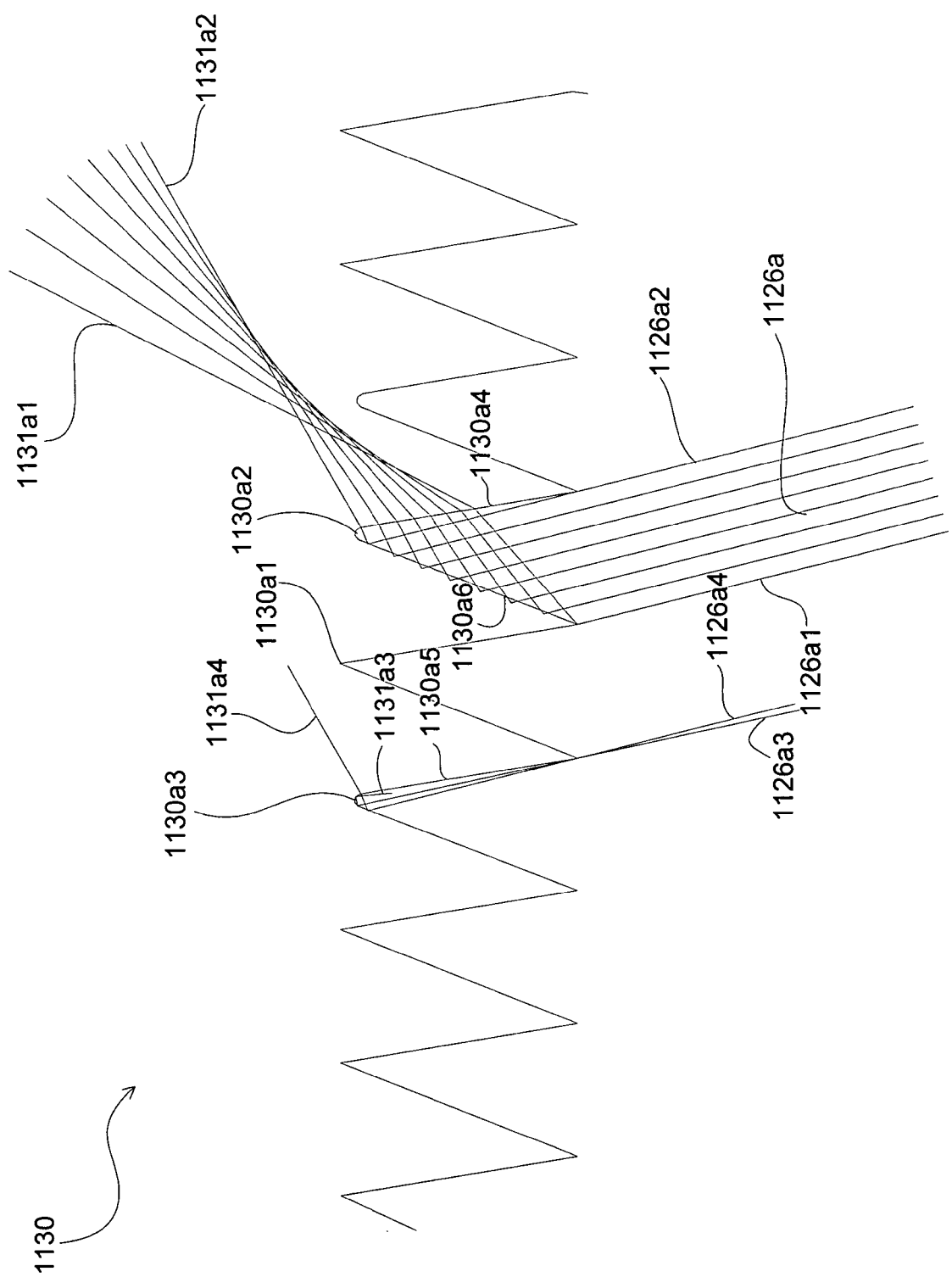
FIG. 11 depicts a second magnified view of various light ray tracing details.

FIG. 11 depicts another enlarged view of a first deviator portion 1130. As can be seen the first and second deviator segments 1130a2, 1130a3, respectively, define a less pointed shape compared to the second deviator segment 1130a1. Due to optics block molding and forming, the second deviator segment may define a more rounded shape. As can be seen, when the light rays 1126a form a desired angle with respect to the third deviator segment 1130a4 light rays 1126a1, 1126a2 are redirected as light rays 1131a1, 1131a2, respectively, as desired. However, when the light rays 1126a form an incorrect angle with respect to the adjoining third deviator segment 1130a5 a portion of the light rays 1126a3 will impinge upon adjoining deviator segments 1130a3 and become totally internally reflected light rays 1131a3. Only a portion of the light rays 1126a4 will be directed as desired light rays 1131a4. In at least one embodiment, the third deviator segment 1130a6 defines a slight convex curve such that substantially all of the light rays 1126a1, 1126a2 are directed as desired to clear all other optics block segments and edges.

Figure 12:
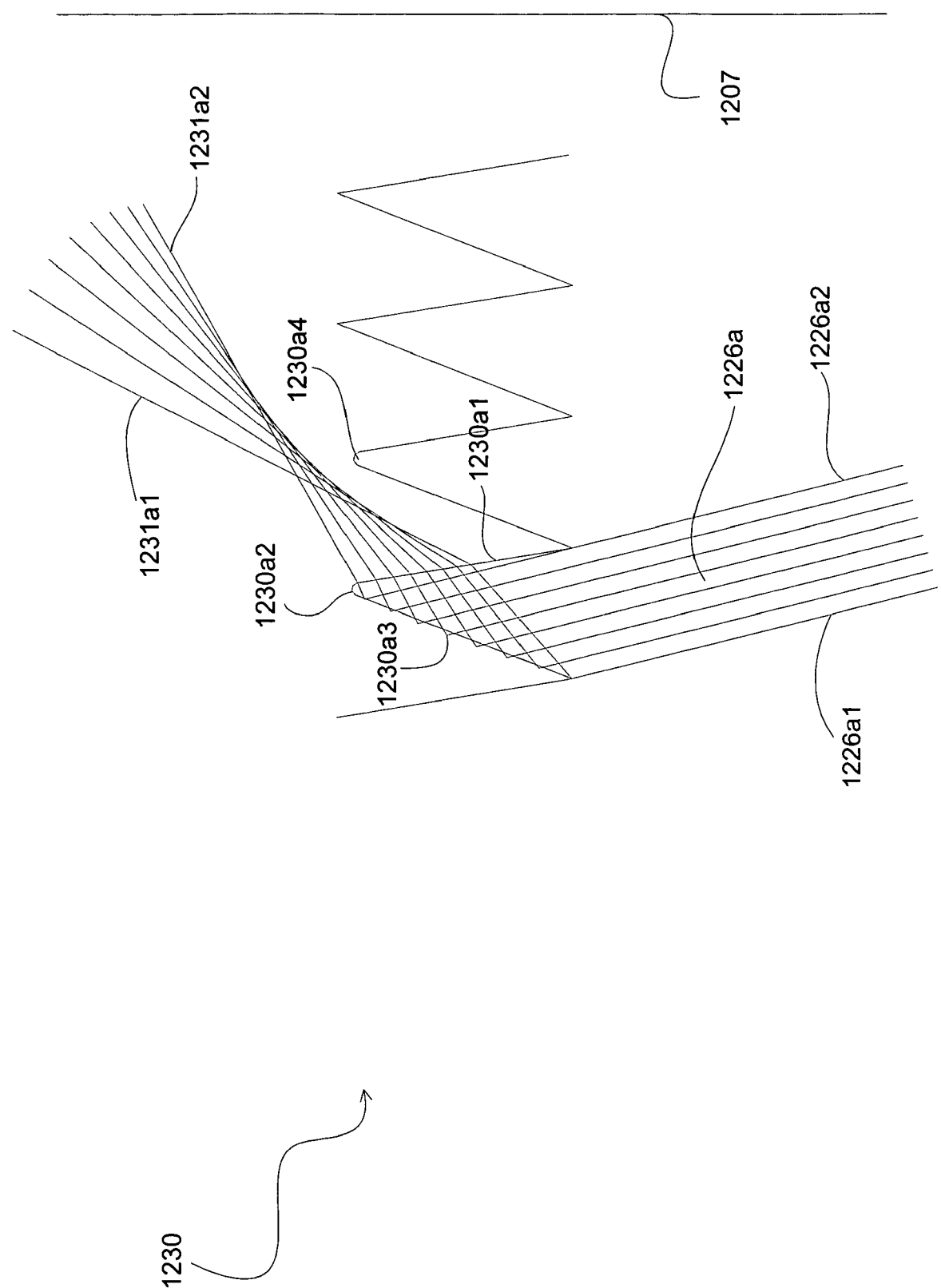
FIG. 12 depicts a magnified view of a portion of the light ray tracing of FIG. 11.

Turning now to FIG. 12, another enlarged view of a first deviator portion 1230 is depicted. Preferably, the first deviator segment 1230a1 forms a smaller angle with respect to the central optical axis 1207 compared to an angle of the light rays 1226a, such that the light rays 1226a1, 1226a2 are redirected as light rays 1231a1, 1231a2, respectively, as desired. In at least one embodiment, the second deviator segment 1230a2 defines a substantially rounded shape and the third deviator segment 1230a3 defines a slightly convex curve. This configuration results in substantially all light rays 1226a clearing the adjoining second deviator segment 1230a4.

Figure 13:
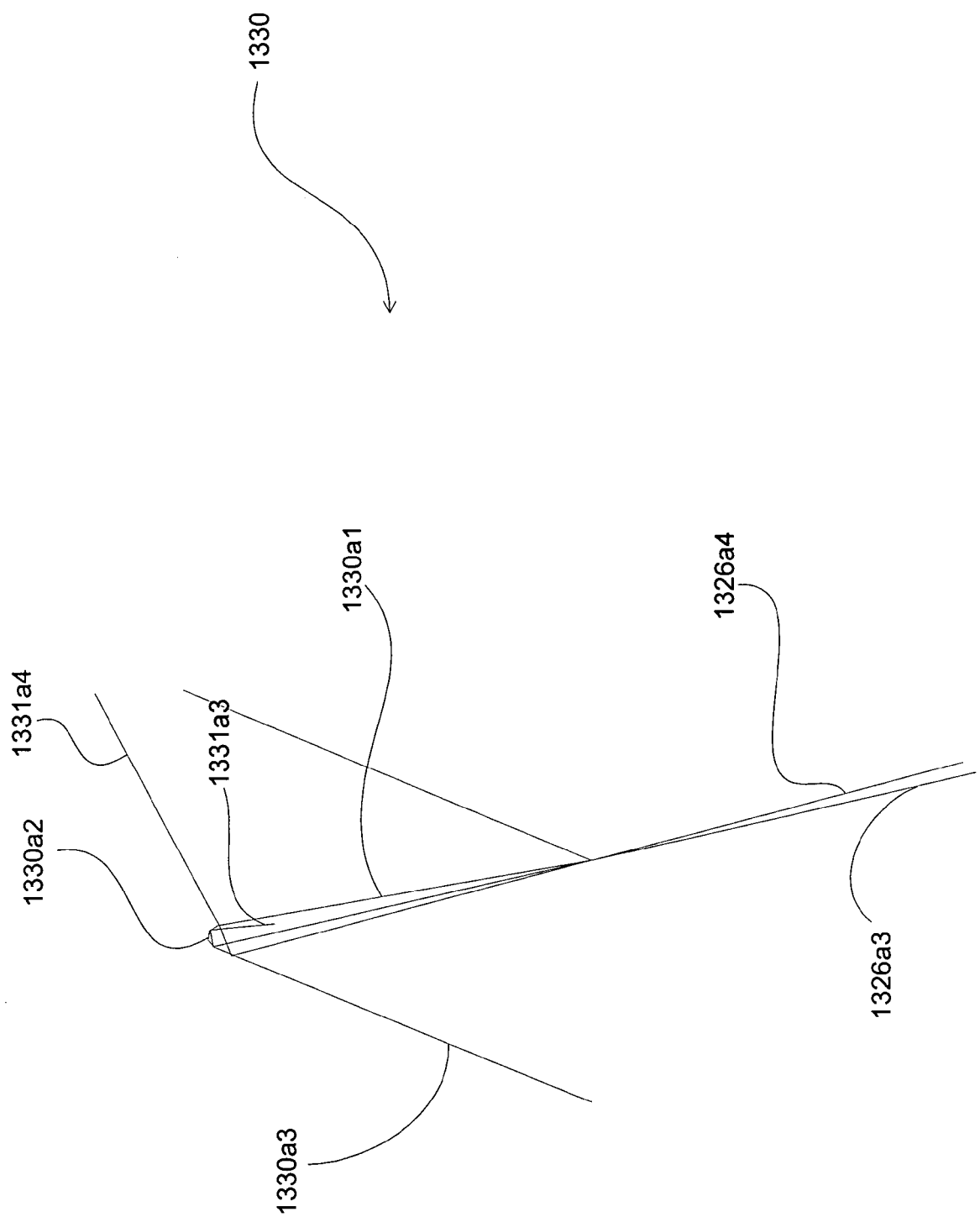
FIG. 13 depicts a magnified view of a second portion of the light ray tracing of FIG. 11.

FIG. 13 depicts another enlarged view of a first deviator portion 1330 having a first deviator segment (preferably, refraction portion) 1330a1, a second deviator segment (preferably, rounded portion) 1330a2 and slightly convex shaped third deviator segment 1330a3. In at least one embodiment, the refraction portion 1330a1 forms an angle that is greater than 5° less than the angle formed by the light rays 1326a4 such that light rays 1331a4 with respect to a central optical axis are emitted in the desired direction. When the light rays 1326a3 are less than 5° less than the angle formed by the first deviator segment, there is a potential for total internally reflected light rays 1331a3 being produced.

Although the present invention has been described with regard to specific embodiments, it should be understood that the scope of the present invention extends to all embodiments encompassed within the doctrine of equivalents.

The invention claimed is:

1. An apparatus, comprising:
    at least one light source for emitting lighting rays, said light source comprising a central optical axis; and
    an optics block configured to direct substantially all of said light rays to define a horizontal beam pattern directed from approximately 0° to approximately 60° outboard, away, from a controlled vehicle with respect to said central optical axis, said optics block is further configured to direct substantially all of said light rays to define a vertical beam pattern directed from approximately −8° to approximately 10° with respect to said central optical axis, said optics block comprising at least one collimating portion.

2. An apparatus as in claim 1 wherein said horizontal beam pattern is substantially directed in the range approximately 32° (+approximately 15°/−approximately 10°).

3. An apparatus as in claim 2 wherein said vertical beam pattern is substantially directed in the range approximately 0° (+approximately 0°/−approximately 5°).

4. An apparatus as in claim 1 wherein said vertical beam pattern is substantially directed in the range approximately 0° (+approximately 0°/−approximately 5°).

5. An apparatus as in claim 1 wherein a minimum of approximately 5 candelas are measurable less than approximately 5° selected from the group comprising: horizontally and vertically.

6. An apparatus as in claim 1 wherein a minimum of approximately 4 candelas are measurable less than approximately 10° horizontally.

7. An apparatus as in claim 1 wherein a minimum of approximately 3 candelas are measurable less than approximately 15° horizontally.

8. An apparatus as in claim 1, said optics block comprising at least one deviator portion.

9. An apparatus as in claim 8 wherein said at least one collimating portion and said at least one deviator portion are substantially aligned with one another.

10. An apparatus as in claim 9 wherein said collimating portion comprises a first collimating portion and a second collimating portion, and wherein said deviator portion comprises a first deviator portion and a second deviator portion.

11. An apparatus as in claim 10 wherein said first collimating portion is substantially aligned with said first deviator portion and said second collimating portion is substantially aligned with said second deviator portion.

12. An apparatus as in claim 1 configured to provide a device selected from the group comprising: an indicator, an illuminator and an information display.

13. An apparatus, comprising:
    at least one light source for emitting lighting rays, said light source comprising a central optical axis; and
    an optics block configured to direct substantially all of said light rays to define a horizontal beam pattern directed from approximately 0° to approximately 60° outboard, away, from a controlled vehicle with respect to said central optical axis, said optics block comprising a first collimating portion, a first deviator portion, a second collimating portion and a second deviator portion.

14. An apparatus as in claim 13 wherein said horizontal beam pattern is substantially directed in the range approximately 32° (+approximately 15°/−approximately 10°).

15. An apparatus as in claim 14 wherein a vertical beam pattern is substantially directed in the range approximately 0° (+approximately 0°/−approximately 5°).

16. An apparatus as in claim 13 wherein a vertical beam pattern is substantially directed in the range approximately 0° (+approximately 0°/−approximately 5°).

17. An apparatus as in claim 13 wherein a minimum of approximately 5 candelas are measurable less than approximately 5° selected from the group comprising: horizontally and vertically.

18. An apparatus as in claim 13 wherein a minimum of approximately 4 candelas are measurable less than approximately 10° horizontally.

19. An apparatus as in claim 13 wherein a minimum of approximately 3 candelas are measurable less than approximately 15° horizontally.

20. An apparatus as in claim 13 wherein said first collimating portion is substantially aligned with said first deviator portion and said second collimating portion is substantially aligned with said second deviator portion.

21. An apparatus as in claim 13 wherein said optics block is further configured to direct substantially all of said light rays to define a vertical beam pattern directed from approximately −8° to approximately 10° with respect to said central optical axis.

22. An apparatus as in claim 13 configured to provide a device selected from the group comprising: an indicator, an illuminator and an information display.

23. A rearview mirror assembly comprising a stationary housing, the apparatus as in claim 13 which is positioned on or within said stationary housing, and at least one device positioned on or within said stationary housing.

24. The rearview mirror assembly as in claim 23 further comprising a mirror housing that is movable relative to said stationary housing.

25. A rearview mirror assembly comprising a mirror housing, the apparatus as in claim 13 which is positioned on or within said mirror housing, and at least one device positioned on or within said mirror housing.

26. An exterior rearview mirror assembly comprising a mirror element and the apparatus as in claim 13 mounted to said mirror, said mirror element swivels such that the light rays from the apparatus are directed in a first direction prior to mirror element swivel and another direction subsequent to mirror element swivel.

27. An apparatus as in claim 26 wherein said mirror element swivels automatically.

28. A rearview mirror assembly comprising a mirror element and the apparatus as in claim 13 mounted behind said mirror element, said mirror element comprising a reflective comprising an area through which substantially all of said light rays pass.

29. The rearview mirror assembly as in claim 28 wherein said mirror element is selected from the group comprising: prismatic and electro-optic.

30. An apparatus, comprising:
 at least one light source for emitting lighting rays, said light source comprising a central optical axis; and
 an optics block configured to direct substantially all of said light rays to define a vertical beam pattern directed from approximately −8° to approximately 10° with respect to said central optical axis, said optics block comprising at least one collimating portion.

31. An apparatus as in claim 30 wherein said optics block is further configured to define a horizontal beam pattern substantially directed in the range approximately 32° (+approximately 15°/−approximately 10°).

32. An apparatus as in claim 31 wherein said vertical beam pattern is substantially directed in the range approximately 0° (+approximately 0°/−approximately 5°).

33. An apparatus as in claim 30 wherein said vertical beam pattern is substantially directed in the range approximately 0° (+approximately 0°/−approximately 5°).

34. An apparatus as in claim 30 wherein a minimum of approximately 5 candelas are measurable less than approximately 5° selected from the group comprising: horizontally and vertically.

35. An apparatus as in claim 30 wherein a minimum of approximately 4 candelas are measurable less than approximately 10° horizontally.

36. An apparatus as in claim 30 wherein a minimum of approximately 3 candelas are measurable less than approximately 15° horizontally.

37. An apparatus as in claim 30, said optics block comprising at least one deviator portion.

38. An apparatus as in claim 37 wherein said at least one collimating portion and said at least one deviator portion are substantially aligned with one another.

39. An apparatus as in claim 38 wherein said collimating portion comprises a first collimating portion and a second collimating portion, and wherein said deviator portion comprises a first deviator portion and a second deviator portion.

40. An apparatus as in claim 39 wherein said first collimating portion is substantially aligned with said first deviator portion and said second collimating portion is substantially aligned with said second deviator portion.

41. An apparatus as in claim 30 wherein said optics block is further configured to define a horizontal beam pattern directed from approximately 0° to approximately 60° outboard, away, from a controlled vehicle with respect to said central optical axis.

42. An apparatus as in claim 30 configured to provide a device selected from the group comprising: an indicator, an illuminator and an information display.

43. A rearview mirror assembly comprising a stationary housing, the apparatus as in claim 30 which is positioned on or within said stationary housing, and at least one device positioned on or within said stationary housing.

44. The rearview mirror assembly as in claim 43 further comprising a mirror housing that is movable relative to said stationary housing.

45. A rearview mirror assembly comprising a mirror housing, the apparatus as in claim 30 which is positioned on or within said mirror housing, and at least one device positioned on or within said mirror housing.

46. An exterior rearview mirror assembly comprising a mirror element and the apparatus as in claim 30 mounted to said mirror, said mirror element swivels such that the light rays from the apparatus are directed in a first direction prior to mirror element swivel and another direction subsequent to mirror element swivel.

47. An apparatus as in claim 46 wherein said mirror element swivels automatically.

48. An apparatus as in claim 30 configured as a rearview mirror and comprising a mirror element comprising a reflective comprising an area through which substantially all of said light rays pass.

49. An apparatus as in claim 48 wherein said mirror element is selected from the group comprising: prismatic and electro-optic.

50. An apparatus, comprising:
 at least one light source for emitting lighting rays, said light source comprising a central optical axis; and
 an optics block configured to direct substantially all of said light rays to define a horizontal beam pattern directed from approximately 0° to approximately 60° outboard, away, from a controlled vehicle with respect to said central optical axis, said optics block is further configured to direct substantially all of said light rays to define a vertical beam pattern directed from approximately −8° to approximately 10° with respect to said central optical axis, said optics block comprising at least one deviator portion.

51. An apparatus as in claim 50 wherein said horizontal beam pattern is substantially directed in the range approximately 32° (+approximately 15°/−approximately 10°).

52. An apparatus as in claim 51 wherein said vertical beam pattern is substantially directed in the range approximately 0° (+approximately 0°/−approximately 5°).

53. An apparatus as in claim 50 wherein said vertical beam pattern is substantially directed in the range approximately 0° (+approximately 0°/−approximately 5°).

54. An apparatus as in claim 50 wherein a minimum of approximately 5 candelas are measurable less than approximately 5° selected from the group comprising: horizontally and vertically.

55. An apparatus as in claim 50 wherein a minimum of approximately 4 candelas are measurable less than approximately 10° horizontally.

56. An apparatus as in claim 50 wherein a minimum of approximately 3 candelas are measurable less than approximately 15° horizontally.

57. An apparatus as in claim 50 wherein said collimating portion comprises a first collimating portion and a second collimating portion, and wherein said deviator portion comprises a first deviator portion and a second deviator portion.

58. An apparatus as in claim 57 wherein said first collimating portion is substantially aligned with said first deviator portion and said second collimating portion is substantially aligned with said second deviator portion.

59. A rearview mirror comprising a mirror element and the apparatus as in claim 50 mounted behind said mirror element, said mirror element comprising a reflective comprising an area through which substantially all of said light rays from the apparatus pass.

60. An apparatus as in claim 50 configured to provide a device selected from the group comprising: an indicator, an illuminator and an information display.

61. An apparatus, comprising:
 at least one light source for emitting lighting rays, said light source comprising a central optical axis; and
 an optics block configured to direct substantially all of said light rays to define a vertical beam pattern directed from approximately −8° to approximately 10° with respect to said central optical axis, said optics block comprising at least one deviator portion.

62. An apparatus as in claim 61 wherein said optics block is further configured to define a horizontal beam pattern substantially directed in the range approximately 32° (+approximately 15°/–approximately 10°).

63. An apparatus as in claim 62 wherein said vertical beam pattern is substantially directed in the range approximately 0° (+approximately 0°/–approximately 5°).

64. An apparatus as in claim 61 wherein said vertical beam pattern is substantially directed in the range approximately 0° (+approximately 0°/–approximately 5°).

65. An apparatus as in claim 61 wherein a minimum of approximately 5 candelas are measurable less than approximately 5° selected from the group comprising: horizontally and vertically.

66. An apparatus as in claim 61 wherein a minimum of approximately 4 candelas are measurable less than approximately 10° horizontally.

67. An apparatus as in claim 61 wherein a minimum of approximately 3 candelas are measurable less than approximately 15° horizontally.

68. An apparatus as in claim 61 wherein said collimating portion comprises a first collimating portion and a second collimating portion, and wherein said deviator portion comprises a first deviator portion and a second deviator portion.

69. An apparatus as in claim 68 wherein said first collimating portion is substantially aligned with said first deviator portion and said second collimating portion is substantially aligned with said second deviator portion.

70. An apparatus as in claim 61 wherein said optics block is further configured to define a horizontal beam pattern directed from approximately 0° to approximately 60° outboard, away, from a controlled vehicle with respect to said central optical axis.

71. An apparatus as in claim 61 configured to provide a device selected from the group comprising: an indicator, an illuminator and an information display.

72. A rearview mirror assembly comprising a stationary housing, the apparatus as in claim 61 which is positioned on or within said stationary housing, and at least one device positioned on or within said stationary housing.

73. The rearview mirror assembly as in claim 72 further comprising a mirror housing that is movable relative to said stationary housing.

74. A rearview mirror assembly comprising a mirror housing, the apparatus as in claim 61 which is positioned on or within said mirror housing, and at least one device positioned on or within said mirror housing.

75. An exterior rearview mirror assembly comprising a mirror element and the apparatus as in claim 61 mounted to said mirror, said mirror element swivels such that the light rays from the apparatus are directed in a first direction prior to mirror element swivel and another direction subsequent to mirror element swivel.

76. An apparatus as in claim 75 wherein said mirror element swivels automatically.

77. A rearview mirror assembly comprising a mirror element and the apparatus as in claim 61 mounted behind said mirror element, said mirror element comprising a reflective comprising an area through which substantially all of said light rays pass.

78. The rearview mirror assembly as in claim 77 wherein said mirror element is selected from the group comprising: prismatic and electro-optic.

\* \* \* \* \*